(12) United States Patent
Zafiroglu

(10) Patent No.: US 8,216,659 B2
(45) Date of Patent: *Jul. 10, 2012

(54) SPRING-LIKE TEXTURED COMPOSITE FLOORCOVERING

(75) Inventor: Dimitri Peter Zafiroglu, Centreville, DE (US)

(73) Assignee: DZS, LLC, Midlothian, VA (US)

( * ) Notice: Subject to any disclaimer, the term of this patent is extended or adjusted under 35 U.S.C. 154(b) by 994 days.

This patent is subject to a terminal disclaimer.

(21) Appl. No.: 12/178,366

(22) Filed: Jul. 23, 2008

(65) Prior Publication Data

US 2009/0047465 A1 Feb. 19, 2009

Related U.S. Application Data

(63) Continuation-in-part of application No. 10/611,470, filed on Jul. 1, 2003, now Pat. No. 7,425,359.

(51) Int. Cl.
*B32B 33/00* (2006.01)
*B32B 5/02* (2006.01)
*B32B 3/10* (2006.01)
*B32B 27/04* (2006.01)
*B32B 27/12* (2006.01)

(52) U.S. Cl. .............. 428/98; 428/131; 442/59; 442/61; 442/86; 442/148; 442/181; 442/304

(58) Field of Classification Search ............. 428/98.131; 442/59, 61, 86, 148, 181, 304
See application file for complete search history.

(56) References Cited

U.S. PATENT DOCUMENTS

| 2,793,674 A | * | 5/1957 | Reinhard ........................ 156/435 |
| 3,616,135 A | | 10/1971 | Tesainer et al. |
| 4,324,824 A | * | 4/1982 | Narens et al. ................... 428/92 |
| 5,175,038 A | | 12/1992 | Tung et al. |
| 5,540,968 A | * | 7/1996 | Higgins .......................... 428/95 |
| 6,063,473 A | * | 5/2000 | Zafiroglu ........................ 428/86 |
| 6,162,748 A | * | 12/2000 | Schilling et al. .............. 442/226 |

OTHER PUBLICATIONS

International Search Report issued, in connection with corresponding International Patent Application No. PCT/US2009/051387, on Sep. 15, 2009.

* cited by examiner

*Primary Examiner* — Matthew Matzek
(74) *Attorney, Agent, or Firm* — The H. T. Than Law Group

(57) ABSTRACT

The present invention concerns a textured floorcovering composite comprising a highly conformable fibrous outer layer 101 and an optional porous and resilient backing layer 102 that are continually, contiguously, or continuously attached to an activated adhesive layer 103 along a three-dimensional, undulating interface. The undulations correspond to depressed and elevated areas on the surface of the composite. Such a composite can be fabricated if its precursor is subjected to heat and pressure for a finite length time, provided that the applied pressure is relatively low, preferably under about 200 psi. The textured composite can be used as a floorcovering that advantageously resists warping and remains insensitive to variations in ambient temperature and humidity, including exposure to water.

23 Claims, 22 Drawing Sheets

$\lambda/\delta \geq 5$

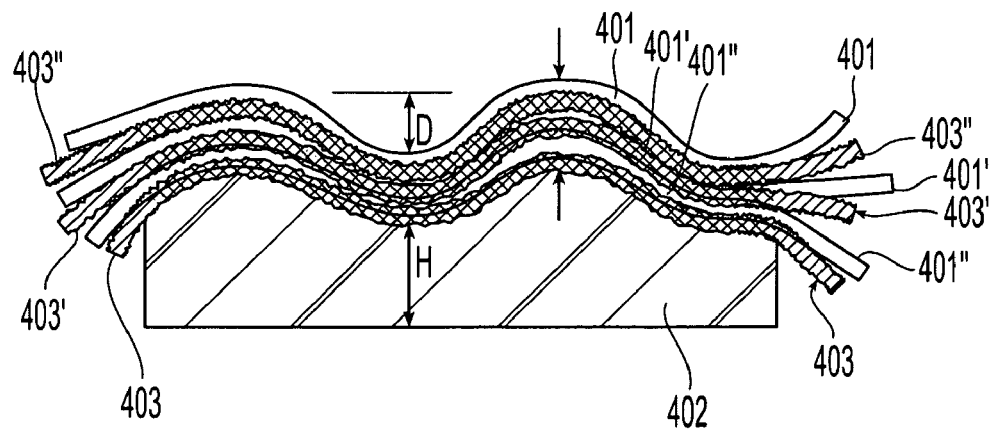
*Fig. 20*
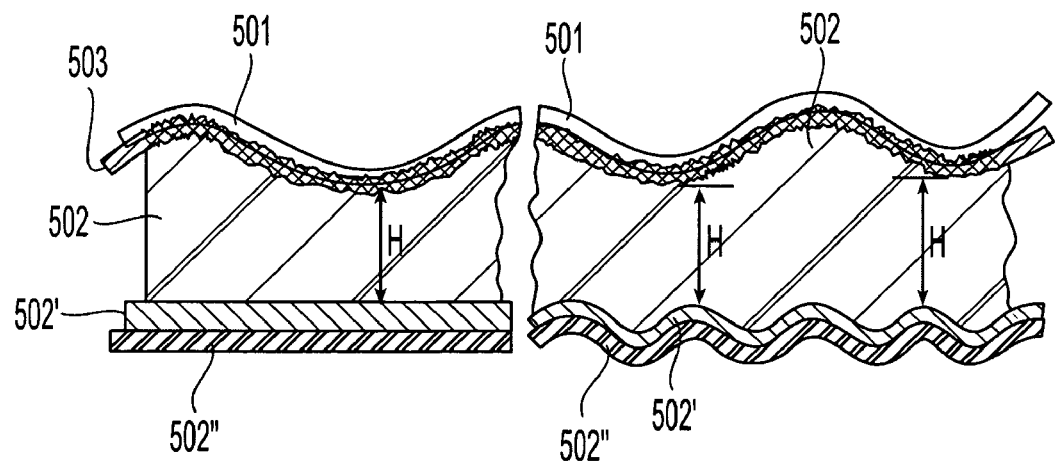
*Fig. 21A*  *Fig. 21B*

SPRING-LIKE TEXTURED COMPOSITE FLOORCOVERING

CROSS-REFERENCE TO RELATED APPLICATIONS

The present application is a continuation-in part of co-pending U.S. patent application Ser. No. 10/611,470, filed Jul. 1, 2003, which is incorporated herein by reference in its entirety.

FIELD OF THE INVENTION

The present invention relates to a composite material having a three-dimensional textured surface and which can be used to provide a finished, outer cover for various substrates. More specifically, the invention relates to a textured composite material having a fibrous outer layer, an adhesive layer and an optional backing layer suitable for covering floors, walls, automotive interior surfaces and the like.

BACKGROUND OF THE INVENTION

Solid surface cover materials used in flooring include rigid surfaces such as wood, metal, marble, or ceramic tile, and resilient surfaces such as vinyl or rubber. They are simple to keep clean and have less of a problem harboring bacterial growth than do textile products. However solid surface cover materials lack the softness, the cushion, and the textile quality of carpets.

Flooring products, such as tufted, flocked, knit or woven pile carpets, provide abrasion resistance as well as cushion with a soft textile feel by anchoring fibers into a backing and holding them upright, as in a pile carpet. Compared to solid surfaces these textile upright-oriented products are less durable, tend to collect dust and dirt, provide spaces for bacterial growth in the interstices between the pile fibers, and they are difficult to clean and sanitize. They also consume excessive quantities of fiber to form the pile. Pile structures should also be secured on the floor, either by attaching with heavy adhesives, or by stretching across the floor to avoid warping, bulging, or seam-separation, as they expand and contract with changes in temperature and humidity. Pile structures used as modular "tiles" should be substantially reinforced under the pile with materials insensitive to temperature and humidity variations, such as glass.

Hybrid structures, with partially fibrous and partially solid faces, such as those disclosed by Petry et al. U.S. Pat. No. 3,493,018, have also been developed. These reduce but do not eliminate the limitations of solid or fibrous pile structures.

Many attempts have been made to adapt textile fabrics to flooring use. One tactic has been to assemble a basically flat textile fabric over a sublayer of adhesive backed with various layers of sub-surface reinforcement using materials such as glass. Such sub-surface reinforcement dimensionally stabilizes the face fabric, and it diminishes or eliminates warping caused by the expansion and contraction of fabric and adhesive, resulting from temperature and humidity variations during use on the floor. WO 1999/019557 utilizes a woven face fabric backed by reinforcing layers. Vinod U.S. Pat. No. 5,965,232 discloses a decorative fabric attached to dimensionally-stabilizing subsurface layers and cushioning layers, and further face-stabilization using surface finishes. Further improvements are offered by WO 2002/102582 and U.S. Pat. No. 7,064,092, which disclose pre-stabilized face fabrics and special sub-facial reinforcements.

All flat prior-art fabric/backing laminates, with or without sub-surface reinforcements, create a relatively stiff upper fabric/adhesive layer, which lacks the cushioning characteristics of textile floor coverings, even when backed by soft and resilient backings. Furthermore, such flat laminates are subject to delamination and fraying at the cut edges when subjected to heavy flooring traffic, unless the face fabric is impregnated with adhesives at least along the edges. However, such impregnation further deteriorates the textile feel and face-cushion quality of the laminate.

To a certain extent, U.S. patent application Ser. Nos. 10/611,470 and 10/307,186, which are incorporated herein by reference in their entireties, describe a floorcovering with a textile surface and the characteristics of a soft floor, without the problems of dirt and dust accumulation and the use of heavy reinforcements. Such floor coverings can be used either as a modular "tile" or a "broadloom" carpet extending across entire floors. The '470 and '186 applications disclose a composite of a highly-conformable fibrous outer layer, a continuous adhesive layer, and a backing layer that are simultaneously laminated and/or embossed with heat and pressure applied against the fibrous outer layer. The embossing/laminating tool has tall protrusions, which form depressed areas on the surface that are surrounded by elevated areas. Within the depressed areas, the fibrous outer layer, the adhesive layer, and the backing layer are highly densified thereby "anchoring" the fabric at intervals by adhesive bonding. Solid thermoplastic adhesives or "viscous/paste-like" thermosets are utilized, thereby preventing the adhesive from propagating to the upper surface within the elevated areas and preserving textile and tactile aesthetics. Consequently, at the elevated areas, inter-bonding of the fibrous outer layer and backing layer is minimal or absent and, as a result, the combined density of the outer layer, adhesive layer, and backing layer is lower in the elevated areas than the depressed areas. In other words, there is a topographical variation in density between the elevated areas and the depressed areas. It was, also however noted that, due to the absence of substantial interbonding within the elevated areas, the fibrous outer layer and backing layer may separate. By contrast, within the depressed areas, wherein the fabric is "anchored" by bonding, the layers cannot be separated without damage to the fibrous outer layer. The undulated three-dimensional fabric/adhesive face structure of these composites, with intermittent bonding to the backing at intervals, allows them to absorb lateral stresses by contracting or expanding the arched spans or "loops" of the face layer connecting the bonded depressed areas, in a manner analogous to the "flexing" of a spring. This characteristic avoids warping on the floor, and allows the construction of floor coverings without the need for heavy sub-surface reinforcement that result in facial stiffness.

The need to reach and anchor the face layer intermittently and exclusively at the depressed areas also limits product aesthetics and performance for the floorcovering of the '470 and '186 applications. Within the elevated areas, the unattached or lightly-attached face fabric may deform and rise slightly at cut edges when subjected to heavy traffic for long periods of time, creating subtle but visible seam lines. The elevated areas may also slightly flatten with severe traffic. Furthermore the simultaneous lamination and embossing process needs to be performed using tools with tall protrusions allowing clearances between the recessions of the heated tool and the face fabric, and limiting design capabilities. The need remains for a more durable floorcovering that takes advantage of the product structuring concepts disclosed by the '470 and '186 applications, without these limitations.

SUMMARY OF THE INVENTION

The present invention comprises improvements or alternatives to the parent '470 application and to prior application Ser. No. 10/307,186, which are incorporated by reference in their entireties. These applications have been published as US 2004/0106346 and US 2004/0106345. The inventive composites described and claimed in the '470 and '186 applications include, but are not limited to, textured multilayer composites with a continuous or integral fibrous outer layer embossed to an adhesive layer and to an optional backing layer. The embossing creates elevated and depressed areas topographically on the surface of the composite creating an undulating profile. The fibrous outer layer is substantially anchored to the adhesive layer and the optional backing layer. Furthermore, the lateral distances between adjacent elevated areas and the depth measured from the elevated to the depressed are sized and dimensioned to allow the composite to expand and/or contract in a manner similar to a spring.

The present invention is directly related to an embodiment of the parent '470 application. Referring to FIGS. 14 and 16, and example 5EE of the '470 application, fully incorporated herein, there is continuous or continual bonding between the fibrous outer layer and the adhesive layer under the elevated areas as illustrated by reference number 66, wherein binder penetrated into the face layer only partially, and wherein the top surface of the composite remained substantially free of activated adhesive. The inventor has observed that under these conditions the durability of the composite as a floorcovering improves and the possibility of edge raveling is reduced. Continual bonding was also observed to reduce the degree of anchorage or embeddness of the fibrous outer layer to the adhesive layer in the depressed areas. Consequently, the combined density of the fibrous layer and the adhesive layer in the depressed areas required by the '470 parent application may be reduced without sacrificing durability.

The present invention concerns a textured composite material having a surface area and comprising a continuous or integral fibrous outer layer that is bonded continually or substantially continuously to an intermediate activated adhesive layer and to an optional compressible, porous and resilient backing layer, wherein the continuous or integral fibrous outer layer is formed from a textile fabric that is initially arranged substantially parallel to the intermediate adhesive layer and to the optional backing layer, wherein the surface area comprises depressed areas and elevated areas.

After the depressed and elevated areas are formed, the fibrous outer layer, the intermediate adhesive layer, the upper surface of the backing layer, and an interface between the adhesive layer and the backing layer are non-planar topographically and follow substantially the same undulating contour. There are a lateral distance, X, between adjacent depressed areas and a lateral distance, Y, between adjacent elevated areas, wherein X and Y each are from about 1.5 mm to about 10 mm. The depressed areas descend to a depth, D, measured from the top of the outer layer at the elevated areas to the top of the outer layer at adjacent depressed areas, that equals or exceeds a thickness, $T_u$, measured from the top of the outer layer at the elevated areas to either (i) the bottom of the adhesive layer or (i) the interface of the outer layer and backing layer at the elevated areas. In most instances, the fibrous outer layer, the adhesive layer, and the backing layer are densified within the depressed areas to a somewhat higher degree as compared to the elevated areas. However the need in the '470 parent application for "anchoring" the face layer by densifying it with adhesive at the depressed areas to very high levels, over 0.7 g/cm³, is obviated by the presence of continuous or continual interbonding of the three layers throughout.

The textured composite material can be manufactured in batch mode or continuously. The embossing and laminating can occur simultaneously or sequentially in either order. The finished textured composite material is useable as a floor cover.

Thus, a spring-like textured composite floorcovering results from the synergistic combination of (i) a depth D that equals or exceeds a thickness $T_u$, (ii) lateral distances X and Y ranging from about 1.5 mm to about 10 mm, and (iii) continual activation of an adhesive layer. The ratio of $D/T_u$ and lateral distances X and Y provide the inventive textured composite with spring-like properties. The innovative spring-like properties are advantageous because they allow the textured composite floorcovering to absorb expansion and contraction induced by temperature and humidity, thus obviating disadvantageous doming, cupping, or shrinkage of the floorcovering.

BRIEF DESCRIPTION OF THE DRAWINGS

In the accompanying drawings, which form a part of the specification and are to be read in conjunction therewith and in which like reference numerals are used to indicate like parts in the various views:

FIG. 20 is a cross-sectional view of a textured composite material with multiple face sublayers according to an embodiment of the present invention;

FIG. 21 is a cross-sectional view of a textured composite with multiple backing sublayers according to another embodiment of the present invention;

FIG. 22A is a precursor structure comprising three superposed layers; FIG. 22B is a laminated structure formed from the precursor structure of FIG. 22A; and FIG. 22C is an embossed structure formed from the laminated structure of FIG. 22B;

FIG. 24A is a precursor structure comprising three superposed layers including an intermediate thermoplastic adhesive layer; FIG. 24B is another precursor structure including an intermediate thermoset adhesive layer; and FIG. 24C is a simultaneously laminated and embossed structure formed from the precursor structure depicted in either FIG. 24A or 24B;

FIG. 26A is a precursor structure; FIG. 26B is an embossed structure formed from the precursor structure of FIG. 26A; and FIG. 26C is a structure filled with backing that is formed from the embossed structure of FIG. 26B;

DETAILED DESCRIPTION OF THE INVENTION

Figure 1:
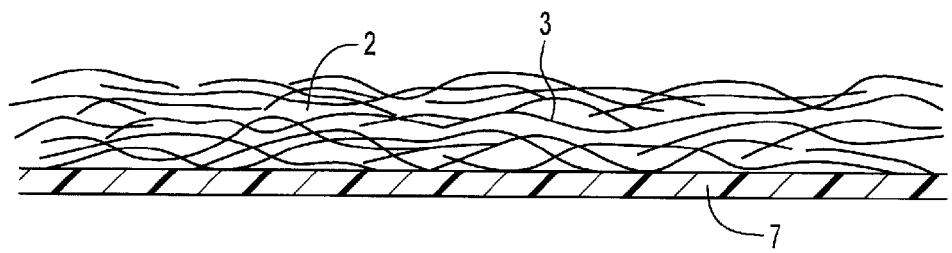
FIG. 1 is a cross-sectional view of a precursor structure for a textured composite material having two layers according to an embodiment of the present invention.

For completeness, the disclosure of the '470 parent application, including FIGS. 1-16, is reproduced below. Thereafter, the present invention is discussed in detail.

The embodiments of the present invention include, but are not limited to, a three-dimensional textured composite material having two or more layers. A two-layer embodiment comprises a fibrous outer layer and an adhesive layer affixed together by laminating or embossing to the fibrous outer layer. A three-layer embodiment further comprises an optional backing layer. Additional optional layers include, but are not limited to, re-enforcing layer(s), additional fibrous outer layer(s), gas permeable layer(s), liquid barrier layer(s), dust, dirt and/or microbial barrier layer(s) and the like.

In accordance to an aspect of the present invention, the fibrous outer layer and adhesive layer are pattern-embossed to form the three-dimensional textured structure. The three-dimensional textured structure includes depressed areas and elevated areas. Within the depressed areas, activated adhesive anchors the fibers of the fibrous outer layer, by embedding an adequate amount of fibers in the activated adhesive. The depressed areas are densified to over 0.7 gram/cm$^3$. Alternatively, the activated adhesive may fully embed all of the fibers in the depressed areas. Due to compression and embedding of the fibers in activated adhesive, the depressed areas are primarily thin, dense and substantially oriented in a so-called "x-y" direction, i.e., parallel to the plane of the composite. The fibers in the fibrous outer layer in the elevated areas are substantially free of activated adhesive although some surface interaction between the fibrous outer layer and the adhesive layer in the inner strata facing the adhesive layer, i.e., the backside, is permitted. In regions near the peak of the elevated areas, the fibers are preferably disengaged from activated adhesive. Accordingly, in the elevated areas of the fibers of the outer layer fibers are capable of moving relative to each other, and maintain a "textile feel" subject to any preexisting bonding or entanglement in the fibrous outer layer.

In accordance to another aspect of the present invention, fibers from the fibrous outer layer immediately adjacent to the depressed areas may be bonded by some of the activated adhesive. In these clusters, the activated adhesives do not anchor the fibers of the fibrous outer layer, but provide some structural rigidity to these fibers. Due to the increased structural rigidity, the fibers in these cluster areas are advantageously oriented diagonal between the x-y plane of the composite and a "z-direction", which is normal to the x-y plane. The fibers in the cluster areas form an angle of less than about 45° away from the z-direction, and more preferably less than about 30° from the z-direction. This upstanding feature of the fibers in the cluster areas provides the fibers in the elevated areas upstanding loop-like formation. Hence, these loops are anchored in the depressed areas, upstanding in the cluster areas, and bended or looped in the elevated areas.

The relative freedom of movement of fibers in the elevated areas allows the textured composite to retain a good amount of textile appearance and feel. The depressed areas anchor the fibers, and provide enhanced surface stability, the ability to maintain its texture, breaking strength and resistance to abrasion. Additionally, when the optional backing is used, the activated adhesive anchors of the outer layer fibers to the backing layer in the depressed areas, and the backing further enhances the ability of the composite to retain its mainly planar configuration in response to ambient temperature and humidity changes. Upward oriented loops resulting from adhesive clustering at the edges of the depressed areas simulate the plush textile feel and sculpted appearance of pile fiber structured fabric.

FIG. 1 illustrates a precursor structure for a two-layer embodiment of the present invention, which includes a fibrous outer layer 2 and an adhesive layer 7 adjacent to the fibrous outer layer. The fibrous outer layer is shown to be formed of individual fibers 3 placed in a nonwoven web. This is only a schematic representation of the fiber structure and does not limit the structure of suitable fibrous outer layer material. Any construction of the fibrous outer layer described below in greater detail can be used.

Figure 2:
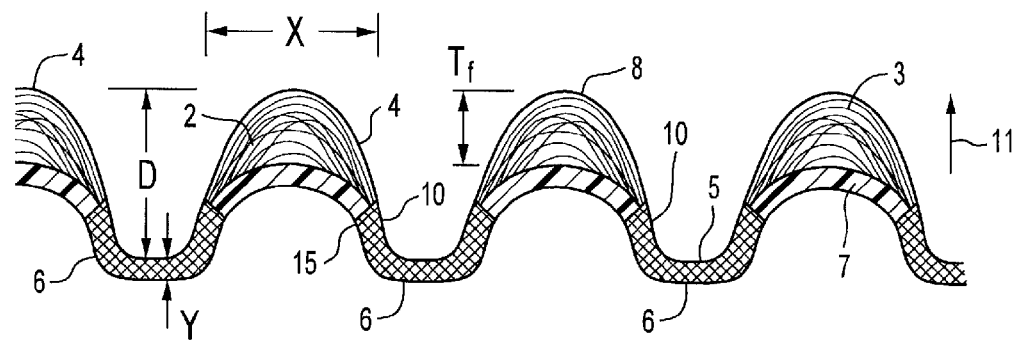
FIG. 2 is a cross-sectional view of a textured composite material according to the present invention formed from the precursor structure of FIG. 1.

FIG. 2 shows a section of the novel two-layer textured composite material formed from the precursor structure in FIG. 1. In the drawings, identical parts are given the same reference numbers. The exposed or outer surface 8 of the composite material is characterized by a plurality of elevated areas 4, which are separated from each other by depressed areas 5. In accordance to an embodiment of the present invention, fibers 3 of the fibrous outer layer 2 within the depressed areas 5 are fully embedded into the adhesive layer 7. In another preferred embodiment, the fibers are not fully embedded into the adhesive layer. The composite formation process, as explained below, activates adhesive 6 within depressed areas 5. Consequently, the activated adhesive forms an integrated solidified mass with fibers 3 such that substantially most or all of the fibers of the fibrous outer layer in the depressed areas are surrounded and bonded together by activated adhesive 6. As much as possible, and preferably most or all of the interstitial space between the fibers in the depressed areas is filled with adhesive layer material, such that the density of the depressed areas is at least 0.7 gram/cm$^3$. Thus, the fibers are bound together and are structurally anchored by the adhesive in depressed areas 5.

FIG. 2 further illustrates that activated adhesive 6 also extends to fibers in transition or adhesive-cluster regions 10 for a nominal distance along the fiber lengths extending from the edges of depressed areas 5 toward elevated areas 4. The adhesive-cluster fibers are oriented substantially diagonal to the z direction, which is indicated by the arrow 11 as discussed above. Thus, the fiber segments in the elevated areas have a prominent upstanding loop-like configuration.

Figure 3:
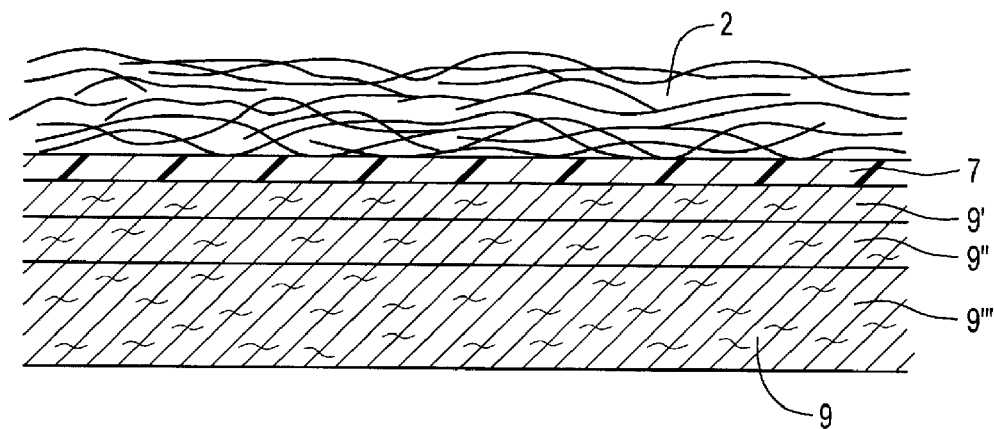
FIG. 3 is a cross-sectional view of a precursor structure for a textured composite material having three layers according to an embodiment of the present invention.
Figure 4:
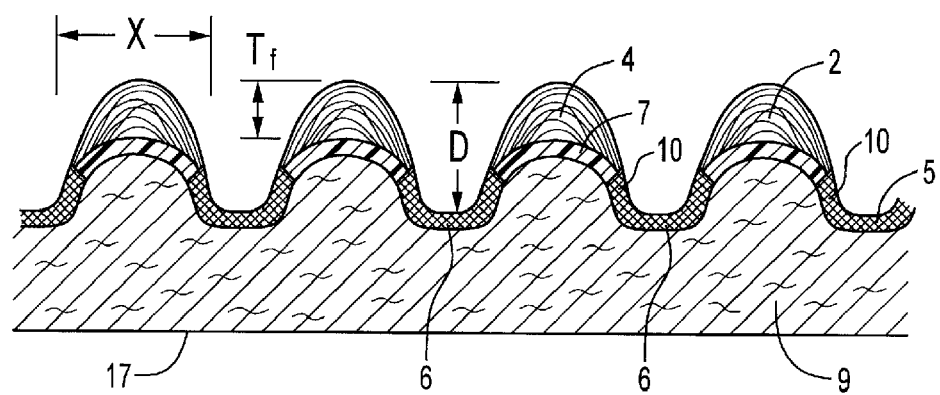
FIG. 4 is a cross-sectional view of a textured composite material according to the present invention formed from the precursor structure of FIG. 3.

FIG. 3 illustrates a precursor structure for a three-layer embodiment of the present invention which includes fibrous outer layer 2 having fibers 3 and adhesive layer 7 adjacent to the fibrous outer layer and optional backing layer 9 adjacent to the adhesive layer on the side opposite to the fibrous outer layer. Another embodiment of the present invention formed from this precursor structure is illustrated in FIG. 4. During the composite formation process, the adhesive activates to bond backing layer 9 to fibrous outer layer 2.

Generally, within elevated areas 4 the outer strata of fibers 3 are substantially free of contact with activated adhesive 6, except in cluster regions 10, where some of the fibers in these regions are bound by activated adhesive 6 thereby providing structural rigidity to the loops formed in the elevated areas, as discussed above. Some internal surface interaction between the fibrous outer layer and the adhesive layer is permitted. Fibers 3 in elevated areas 4 can have small amounts of adhesive on parts of their fiber lengths and occasionally groups of individual fibers can be stuck together by the manufacturing processes that formed fibrous outer layer 2. The adhesive may also penetrate partially along the entire backside of the fibrous layer. In contrast with depressed areas 5, interstitial spacing exists between fibers of the outer layer within elevated areas 4, and the density of elevated areas 4 is significantly lower than the density of depressed areas 5. Notwithstanding the relatively small amount of permissible pre-existing inter-fiber adhesion in elevated areas 4, fibers 3 remain largely free of activated adhesive from the adhesive layer, and therefore, are free to move relative to each other.

In other embodiments, fibrous outer layer 2 is formed from nonwovens in which the fibers are bound to each other at fiber cross over points. For example, fibrous outer layer 2 can contain certain low-melting fiber or powder components, which may or may not be activated prior to the embossing operation utilized to form the textured composite. Prior to or during the embossing operation these, low-melting fiber or powder components can be activated to form bonds between fibers in the elevated areas, so long as fiber 3 within the elevated areas are substantially free of contact with activated adhesive 6.

Fibrous outer layer 2 can also comprise non-entangled fibers and/or lace, woven, knitted or other fabrics in which individual fibers or groups of fibers, i.e., yarns, are woven together, entangled, or otherwise mechanically interconnected or interbonded. Fibrous outer layer(s) can include an open structure, such as lace so that any underlying substrate can be seen through the open structure, or a closed structure so that the underlying substrate is substantially hidden from view.

A durable "integral/continuous" layer of this type simply entails direct immersion of fibers exposed on the surface into the adhesive rich and dense depressed areas 5, at least at one location. Fibers that do not themselves enter depressed areas 5 are secured to other fibers that enter by bonding, entanglement, twisting or other methods.

FIGS. 2 and 4 further schematically illustrate that the undulating shape of fibers between anchor points in depressed areas 5 and free movement portions in the elevated areas form pile-like loops.

Figure 5:
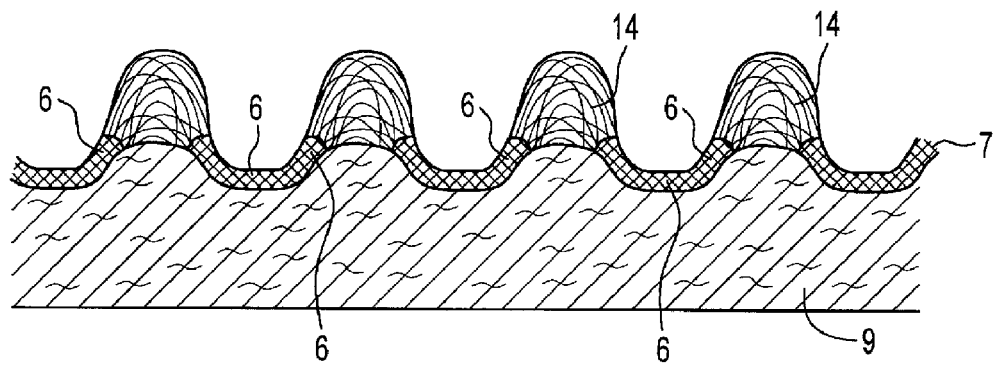
FIG. 5 is a cross-sectional view of another embodiment of a textured composite material according to the present invention.

In another contemplated embodiment seen in FIG. 5, discontinuities or breakages 14 can be created in the adhesive layer 7 during fabrication. Such a discontinuous adhesive layer can occur when the adhesive utilized to form the layer is a thermoplastic sheet that shrinks and splits between depressed areas from exposure to the thermal embossing steps of the composite manufacturing process. Similarly, discontinuities can form when heat from the embossing tool is insulated by the intervening bulky fibrous outer layer that the powder adhesive or thermosetting paste adhesive in the elevated areas does not activate. The un-activated areas of these adhesive types typically are not sufficiently expandable or flexible to conform to the undulating contour of the adjacent surface of the backing layer 9. The adhesive layer thus tends to separate under the elevated areas.

Figure 14:
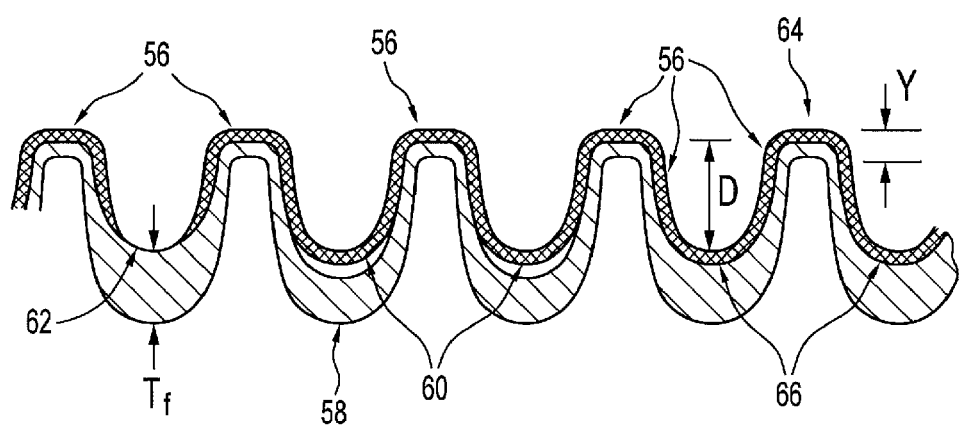
FIG. 14 is a cross-sectional view of another embodiment of a textured composite according to an embodiment of the present invention.
Figure 16:
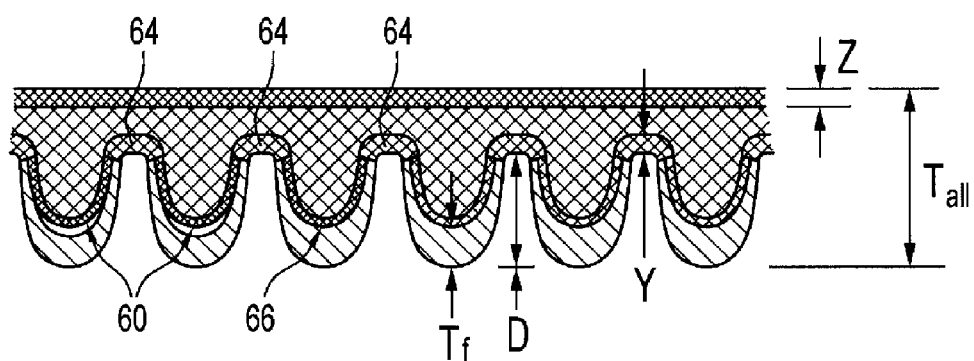
FIG. 16 is a cross-sectional view of another embodiment of a textured composite according to an embodiment of the present invention.

In accordance to another aspect of the present invention, elevated areas 4 define characteristic elevation distances, D (FIGS. 2 and 4). Elevation distance D is defined as the difference in height in the Z direction between the peaks of the elevated areas and the neighboring depressed areas. Thickness $T_f$ of the fibrous outer layer in the finished product is another defining parameter of the composite. This parameter is defined as the thickness in the z direction between the peak of the fibrous outer layer and the adjacent surface of the next underlying layer of the composite. The thickness of the depressed area is defined as Y, as shown in FIGS. 2, 14 and 16, and it is the distance between the exposed face of the depressed area and the maximum penetration of the adhesive.

The three-dimensional texture is further characterized in that the elevation distance D is greater than the thickness $T_f$ of the fibrous outer layer in the elevated areas. Preferably, the ratio of D to $T_f$ is greater than about 1.25, more preferably greater than about 1.5, and most preferably greater than about 2.0.

With reference to FIG. 2, it is seen that a novel two-layer composite in which D is greater than $T_f$ will have an undulating reverse or bottom side 15. The undulations on the reverse side occur when the adhesive layer is thin, that is, less than about 0.12 mm (5 mils). When a thicker adhesive layer is utilized an undulating reverse side will occur when a deep probing embossing tool and a soft, impressionable opposing tool are used during composite fabrication to be explained in detail, below. In circumstances, which utilize less deeply probing embossing tools and/or thicker composite sublayers, e.g., as in FIG. 4, the reverse side of the composite will retain a largely flat profile 17.

In accordance to another aspect of the present invention, the density of the fibrous outer layer, i.e., number of fibers per unit volume of the elevated areas is relatively high, although this density remains substantially lower than the density of depressed areas 5. The desired high density is achieved by maintaining the lateral distance X (FIGS. 2 and 4) between adjacent depressed areas relatively small. The combination of high $D/T_f$ ratio and small value of X helps to assure that the textured composite material has superior resistance to abrasion and deformation even though the fibers in the elevated areas are substantially free of activated adhesive. Preferably, distance X should be about 1.5-10 mm, and more preferably about 1.5-4 mm. Moreover, $D/T_f$ ratio and X should be selected to provide a density of the fibrous outer layer of greater than about 0.2 g/cm$^3$. By itself or in combination with a suitable adhesive layer, the high density also provides a good barrier to dust and bacteria, which allow convenient cleaning and sanitizing of the composite. By anchoring the fibers of the fibrous outer layer at small intervals, abrasion resistance, and thus durability of the composite are increased.

While the figures illustrating the present invention show the inventive textured composite as uniformly and regularly undulating composites, the present invention is not so limited. The inventive textured composite may have combinations of embossing patterns of different depths, frequencies and shapes to produce various sculptured effects. Such sculptured effects may include demarcation lines or patterns facilitating cutting and seaming along such lines to hide seams.

Incorporation of a suitable backing layer can impart to the composite a superior resistance to distortion induced by changes in temperature and humidity. Many conventional planar fabric composites can develop a bumpy terrain caused by so-called "doming" and "cupping". Doming is an upward rise in the z-direction from a flat support in the center of a portion of the composite caused by expansion of an upper layer relative to an underlying layer. Cupping is an upward rise in the z-direction from a flat support at the periphery of a portion of the composite caused by a contraction of an upper layer relative to an underlying layer. Matching the thermal and moisture-related expansion and contraction coefficients of the face layer, adhesive layer and backing layer can eliminate or prevent doming and cupping. The undulated shape of the face and adhesive layers makes this matching less preferred because the sinusoidal face/adhesive layers expand and contract without placing high stresses on the upper face of the composite.

Stability versus thermal and humidity changes can be determined with a dimensional stability test, as follows. A 20.3 cm×20.3 cm (8 inch×8 inch) square sample of material to be tested is placed on a flat surface in an oven at 80° C. The sample is kept in the oven for 1 minute. The sample is taken from the oven and allowed to cool to room temperature for 30 minutes. The cooled sample is immersed in water and permitted to dry in a horizontal orientation on a flat surface for 48 hours at room temperature. The sample is examined for doming, and cupping. Measurements of vertical offset between the center and the edge of the sample are made immediately prior to removing the sample from the oven, at the expiration of the 30-minute cooling period and at the end of the 48-hour drying period. Less than about 4 mm vertical deflection from a horizontal plane is considered to demonstrate absence of doming or cupping.

In accordance to one aspect of the present invention, the three-dimensional texture of the fibrous outer layer can be formed without the application of heat. For example, the outer layer can be formed of various knits, spunlaced or needle-punched nonwovens and stitch-bonded fabrics. The desired three-dimensional structure, i.e., elevated areas of substantially non-adhered fibers isolated from each other by depressed areas of adhesive-impregnated fibers, can be formed by using thermosetting and/or pressure sensitive adhesives, for example.

In accordance to another aspect of the present invention, the three-dimensional texture of the fibrous outer layer is formed by a thermal operation, such as thermal embossing. To accomplish this, the fibers in the fibrous outer layer should be extensible in the x-y directions under the stress applied during the embossing at elevated temperatures. Upon heating above a softening temperature, such outer fibrous layer will elongate while maintaining fiber form and upon subsequent cooling it will assume its remolded configuration. The fibrous outer layer can also be composed exclusively or in part by materials such as knit, spunlaced, needle-punched non-woven and stitch-bonded fabrics. Such materials are intrinsically extensible in the x-y direction, even when the fibers are formed from inextensible fibers. Other moldable fibrous structures that can be laminated into the three-dimensional textured surfaces of the present invention include webs of unbonded filaments, staple webs, warps of textured yarns, and the like.

Fibers 3 of the fibrous outer layer 2 should be of a material that melts at significantly higher temperature than the activation temperature of the adhesive layer 7. Preferably the temperature differential should be greater than about 20° C., more preferably greater than about 50° C. and most preferably greater than about 100° C. The use of high melting temperature polymeric materials for the fibers is advantageous, because it permits utilizing thermoplastic adhesive compositions that activate at higher temperatures. It also provides a composite that can function in higher temperature service environments. A low melting temperature fiber composition calls for use of a still lower activation temperature adhesive composition. The maximum product service temperature will then be limited by the adhesive activation temperature. Preferably, the melting temperature of the fiber should be at least about 150° C. Thermoplastic synthetic polymeric fibers are preferred. Representative examples of polymers for the fibers include, but are not limited to, polyesters, polyamides, polyaramids and combinations thereof. Polymers melting below 150° C., such as polyethylene and other polyolefins, can be used provided that the adhesive composition has a suitably low melting temperature and that the expected service temperature is sufficiently below the adhesive melting temperature to preserve product functionality. Also, thermosetting adhesive compositions that activate at low temperatures and are stable up to the fiber melting temperature can be utilized with low melting fiber compositions. Natural fibers such as cotton and wool can be used either free of, or blended with, synthetic polymeric fibers.

Commercial examples of fibrous outer layer suitable for use in the present invention include spunbonded polyester nonwovens sold under the tradename Reemay®, spunbonded polyolefin fabrics sold under the tradename Typar® fabric, and spunbonded polyamide sold under the tradename Cerex® spunbonded nylon fabric. Staple nonwovens containing low-melt thermoplastic binders are also suitable. Knit fabrics that are moldable can be used as well. Woven fabrics that are sufficiently heavy and loosely woven fabrics such that they can shift and deform significantly with localized pressure are also suitable. More specifically, woven fabrics of textured filament or staple yarns having warp and weft densities of less than about 20 yarns per inch can be used.

Particularly suitable fibrous layers for the outer layer are spunlaced nonwoven fabrics that are hydraulically needled with relatively high energy to improve surface stability. Preferably, needling is predominantly performed on the exposed surface, the fibers are under about 2 inches long, and needling energy are over 20 HP·HR/lb. Preferably, the basis weight of the spunlaced outer layer is about 1 to about 5 oz/yd$^2$, and the spunlaced outer layer is made from a layered woodpulp/staple composite.

Conformable stitch-bonded fabrics, which utilize elastic, inelastic, textured, flat or thermally shrinkable yarns, are preferred. A vast variety of stitch-bonded fabrics were found to be very highly moldable and therefore suitable for use with the present invention.

Typically, the fibrous outer layer's basis weight is in the range from about 0.07-0.5 kg/m$^2$ (2 to 15 oz/sq. yd.). Fiber deniers may range from microfibers, that is, less than $1.11 \times 10^{-7}$ kg/m (1 denier) per filament to about $28 \times 10^{-7}$ kg/m (25 denier) per filament. Preferably, at least about 50 wt. % of the fibers in the fibrous outer layer should be at least $3 \times 10^{-7}$ kg/m (3 denier) for improved abrasion resistance. The density of the fibrous outer layer is in the range of about 0.1 g/cm$^3$ to about 0.6 g/cm$^3$, and preferably about 0.2 g/cm$^3$.

Surface characteristics of the fibers used in the fibrous outer layer can affect the adhesion between this layer and the adhesive layer. Preferably, the fibrous outer layer material presents a relatively rough surface toward the adjacent adhesive layer such that a strong bond with the adhesive layer can be formed. For example, gathered fabrics with many fiber loops or ends emerging at this interfacing surface are well suited for the fibrous outer layer in this respect. Tightly woven, knit or highly bonded and surface-bonded spunbond filament nonwoven fabrics may present a relatively smooth interfacing surface to the adhesive layer that good bonding can be difficult. Tight weaves, especially those using non-textured, straight-filament yarns can also present adhesion problems. The reduced adhesion from such smooth interfacing surfaces can be overcome by roughening the interfacing surface of the fibrous outer layer facing toward the adhesive layer. This is disclosed in commonly owned U.S. patent application Ser. No. 10/611,769, entitled "Fabric-Faced Composites and Methods for Making Same," by the same inventor as the present invention, which is incorporated herein by reference in its entirety. This can be accomplished by sanding or brushing the outer layer undersurface to raise ends or loops. In contrast, gathered fabrics with loopy surfaces can be used as formed without the need to roughen their surface.

A textured composite having multiple fibrous outer layers is within the scope of the present invention. Porous thin fabrics, lightweight webs, open arrays of textured yarns and the like can be superposed on other fibrous layers and co-anchored at the depressed areas to provide special decorative or utilitarian effects.

The adhesive layer can be thermoplastic or thermosetting composition, as discussed above. Adhesive in particulate or liquid forms can be applied to the fibrous outer layer by dusting, spraying, dipping, painting, roller coating or other conventional methods. However, the adhesive composition is preferably provided as a continuous layer coextensively underlying the fibrous outer layer. This configuration advantageously facilitates the formation of the three-dimensional texture of the outer layer, because it assures that the tips of the embossing tool will always contact areas where the adhesive is present. In accordance to another aspect of the present invention, the adhesive composition can be selected to have barrier properties that effectively prevent transmission of liquids. Thus, the adhesive layer can be adapted to block spilled liquid from penetrating to the optional underlying backing layer, and to the underlying surface covered by the textile composite material. This enhances the ability to clean the cover material, to resist bacterial growth and odor development beneath the composite material and to retard or eliminate degradation of the substrate. Alternatively, a liquid transmissive composition can be utilized for the adhesive layer. Also, a separate liquid-blocking layer penetrated by adhesive in the depressed areas can be used.

Representative thermoplastic compositions suitable for the adhesive layers in the present invention include polyolefins, such as polyethylene and polypropylene, and substituted polyolefins, such as vinylidene chloride (sometimes known by the tradename "Saran"). Fillers and additives can be added to the adhesive layer to modify the properties of the composite. Incorporation of fillers such as chalk increases stiffness without increasing melt viscosity. Pigments and other additives may be utilized. Polyesters and polyamides' melting temperature are usually too high for use as a thermoplastic adhesive. However, they can be modified by blending with softer, lower-melting polymers to form a polymeric blend. These polyester or polyamide blends have lower adhesive activation temperatures, such that activation does not distort or degrade the fibers in the fibrous outer layer. Therefore, the polymeric blends can be suitable for use as the adhesive compositions.

Thermoplastic adhesive material can be applied as free flowing particles, such as polymer pulp, grains, powder, and staple fibers, as a unitary structure such as a film, in the form of unbonded fibers in a nonwoven web, or as a woven, knit or nonwoven fabric or a combination thereof. Unitary structure thermoplastic adhesive materials tend to contract prematurely during thermal processing to activate the adhesive. However, advantageously according to the present invention, the protrusions of the embossing tool pin the adhesive layer in place prior to shrinking. At the same time, the higher-melting fibrous outer layer insulates the adhesive layer under the elevated areas from direct heat. This reduces or eliminates deformation due to shrinkage from occurring during thermal composite fabrication.

Thermosetting adhesive materials can also be used. These are typically applied as pastes or relatively viscous suspensions or solutions that are applied to a top side of the backing layer or to the underside of the fibrous outer layer. The thermosetting adhesive material then can be activated with heat during the embossing operation.

Thermosetting adhesive should not cure before the three-dimensional texture is formed in the fibrous outer layer. Premature curing of thermosetting adhesive is typically avoided because (a) heat is normally applied to the adhesive layer by the embossing tool through the fibrous outer layer, and (b) the fibrous outer layer typically acts as a thermal insulating material. Care should be exercised when the fibrous outer layer is relatively thin.

Similar to thermoplastic adhesives, thermosetting adhesive materials are chosen to anchor and/or embed the fibers within the depressed areas. Examples of thermosetting adhesives suitable for use in the present invention include, but are not limited to, starches, urethane adhesives and various so-called latex adhesives, such as the styrene butadiene rubber ("SBR") compositions commonly used in the manufacture of carpets.

In embodiments such as the one illustrated in FIGS. 3 and 4, the backing layer is bonded to the side of the adhesive layer opposite the fibrous outer layer, i.e., the underside of the adhesive layer. The backing layer primarily adds structural stability and, in certain embodiments, cushioning to the composite. Structural stability is enhanced by the stiffness and strength of the backing layer, which allows it to resist forces that would tend to stretch and distort the composite laterally. Cushioning can be provided by utilizing a deep and resilient backing layer material. The degree of cushioning can be adjusted by selecting backing materials of different depth and resilience. For example, to achieve high cushion a thicker backing layer of a very resilient, usually porous material, such as a fibrous felt with a density of up to about 0.2 g/cm$^3$ can be used. On the other extreme, the composite can be made firm by using a typically thin backing layer of comparatively less resilient material, such as a synthetic rubber with a density greater than about 1.2 g/cm$^3$.

The present invention can also utilize a combination adhesive/backing layer consisting of a pre-integrated layer of adhesive and a backing layer. Also suitable is a construction where a low-melt thermoplastic adhesive or a thermoset adhesive is pre-introduced into the backing in sufficient concentrations to provide the adhesive level needed to anchor the face layer. An example of such a construction includes a polyester/polyolefin felt with 25-60% polyolefin.

The composition of the backing layer should also have sufficient cohesive strength to endure anticipated wear from use. For example, a textured composite material used for a floor covering utility should be able to withstand the foot traffic duty cycle in the area of floor that the cover will be positioned. Also, the backing layer should be able to adhere well to the adhesive layer. Thus the backing layer can be solid, that is, void free, or porous. If porous it can be formed of fibers, foam and like substances.

The backing layer can be compositionally isotropic. In another aspect backing layer 9 can be stratified and comprise a plurality of strata 9', 9'' and 9''' illustrated in FIG. 3. Each sublayer in the stratified backing layer can have a different composition and/or structure to achieve different degree of hardness (i.e., cushioning effect) and porosity. This technique can be used to further tailor the properties of the textured composite material. A compositionally isotropic backing layer can be stratified by treating the surface opposite the fibrous outer layer with adhesive, heat, pressure and/or embossing.

In accordance to another embodiment, a stratified backing layer is formed from a top sublayer, that is, adjacent to the adhesive layer and the fibrous outer layer, and a bottom sublayer. The top sublayer is typically thinner than the bottom sublayer, normally being less than about 10% of the thickness of the backing layer. This top sublayer can be formed of a low melting thermoplastic composition similar to that of the adhesive layer. When the composite material is fabricated the top sublayer fuses with the adhesive layer to create a very strong bond between the backing and the fibrous outer layer. In accordance to another embodiment, the top sublayer of the backing can serve as the adhesive layer and thereby anchor the fibers of the fibrous outer layer directly into the backing layer and eliminate the need of a separate adhesive layer. In accordance to another embodiment, the top sublayer of the backing layer comprises a fibrous composition that provides good adhesion to the underside of the adhesive layer and also is impressionable to create tall elevated areas, i.e., having large D dimension. Particularly preferred for such top sublayers are fibrous felted layers (needle-punched) with a large number of upstanding fibers or fiber loops on their top surface. In another preferred embodiment, the backing layer consists of an elastomeric, open foam layer supported by an underlying relatively rigid bottom sublayer.

Preferably the backing layer weight should be in the range of about 0.14-3.1 kg/m$^2$ (4 and 80 oz/sq.yd) and the total thickness should be about 2-20 mm.

All of the upper part of a backing layer can preferably be prepared by needle punching a blend of heavy denier polyester fibers and low-denier polyolefin fibers so that the polyolefin fibers are driven towards the surface mating with the adhesive and face layers, and the polyester fibers remain relatively planar. In this manner, final adhesion is improved and dimensional stability remains high with the polyester having little or no reaction to humidity or temperature changes.

An exemplary backing layer is a felt with a basis weight in the range of about 4 to about 30 oz/yd$^2$ and is needle punched with a density of about 300 to about 1000 penetrations per inch. The backing layer can be needle punched from the bottom, and may have a thermoplastic binder layer is attached thereto. The backing layer comprises about 60% to about 90% polyester and about 10% to about 40% polyolefin. The polyester comprises fibers having about 5 to about 25 denier per filament and the polyolefin comprises fibers having about 1 to about 3 denier per filament. The polyester fibers have a length of about 1.5 inches to about 6 inches and the polyolefin fibers have a length of about 0.5 inch to about 2 inches.

Additionally, the backing layer and the adhesive layer can be pre-integrated. The backing layer and the adhesive layer can be laminated by needling. The materials of the backing and adhesive layers are substantially evenly blended and the adhesive layer comprises about 20% to about 60% of the total weight of the combined weights of said two layers. Alternatively, the backing layer may comprise adhesive fibers, and the backing layer has about 40% to about 80% polyester and about 20% to about 60% polyolefin.

Figure 6:
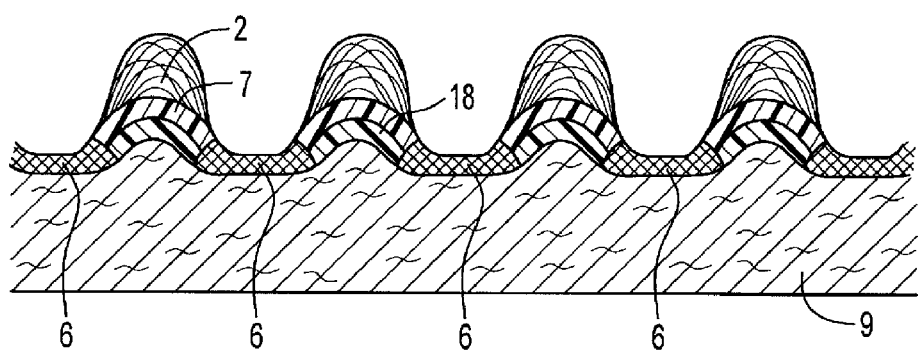
FIG. 6 is a cross-sectional view of another embodiment according to the present invention.

In accordance to another aspect of the present invention, the textured composite material includes an optional breathable layer 18 illustrated in FIG. 6. This layer is of a composition that permits vapor transmission but is a barrier to liquids. Normally the breathable layer is inserted between the adhesive layer 7 and backing layer 9, but can be inserted between fibrous outer layer 3 and adhesive layer 7, if the breathable layer possesses adhesive property. Preferably, the breathable layer is applied as a polymeric film that becomes bonded to the composite during the elevated area formation step of assembly. Representative materials suitable for use as the breathable layer include expanded poly(tetrafluoroethylene) ("e-PTFE") also known as Goretex® fluoropolymer, polyurethane film, plexifilamentary nonwovens such as Tyvek® spunbond polyolefin, subdenier meltblown polyolefin, and the like.

The novel textured composite can be readily formed by a thermal process that involves a combination of laminating and embossing. In general, the process involves providing the individual fibrous and adhesive materials and optional backing and other optional material components that will form the various layers of the composite; juxtaposing the individual components; and then compressing the components at preselected conditions of time, temperature and pressure to effect the lamination. Optionally, the adhesive layer can be pre-tacked to either the face layer or the backing layer.

A combined laminating and embossing treatment is preferably effected by compressing the appropriately stacked layers of individual components against a deeply contoured embossing tool, such as a pressure plate, patterned calender roll or patterning belt. The embossing tool is directed toward the fibrous outer layer side of the stacked precursor materials, illustrated in FIGS. 1 and 3, and presses the back of the stack against an opposing backup tool, such as a second pressure plate, roll or belt. Heat is applied during compression to activate the adhesive components and thereby affect durable bonding of the individual components into an integrated composite.

Preferably, both the adhesive activation and laminating heat are applied to the precursor materials via the embossing tool. Thus, creation of the three-dimensional texture of the fibrous outer layer and the formation of an integrated composite from individual layers occurs simultaneously.

Figure 7:
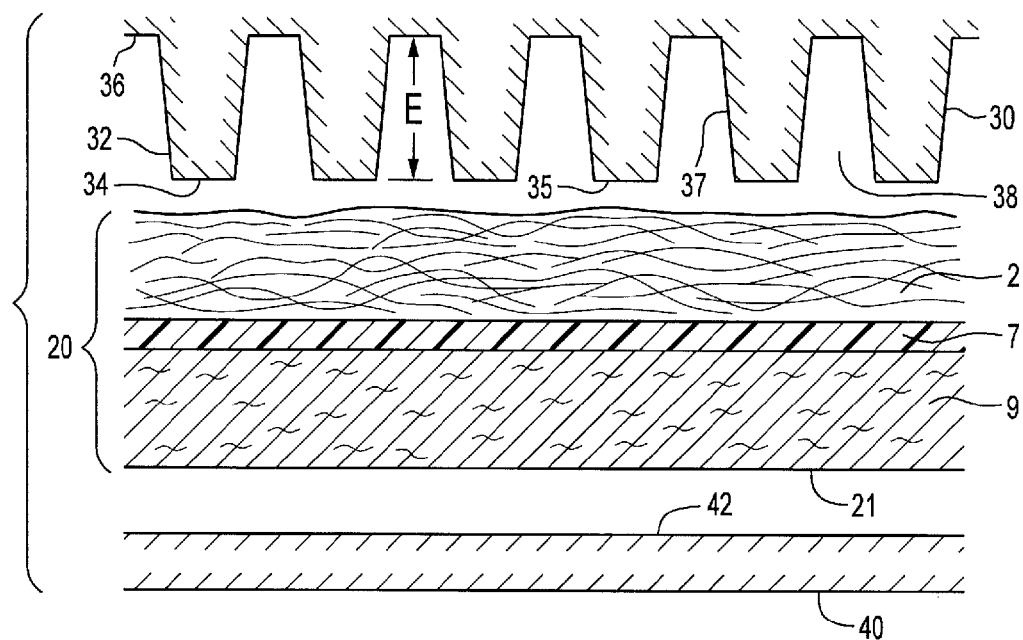
FIG. 7 is cross-sectional view of a portion of a fabrication system suitable for embossing and/or laminating a textured composite material according to an embodiment of the present invention.

Salient features of a tool adapted to perform the embossing and laminating process according to the present invention are illustrated in FIG. 7. The figure illustrates in cross-sectional view a portion of a precursor 20 of a three-layer embodiment of the novel textured composite material. The precursor comprises fibrous outer layer 2, adhesive layer 7 and backing layer 9 positioned adjacent each other in the order stated. An embossing tool 30 is positioned with protrusions 32 pointing toward fibrous outer layer 2. A backup tool 40 is disposed at backing layer 9 of the precursor. The backup tool has a flat working surface 42. To produce the three-dimensional textured, laminated product, the embossing tool is heated and the embossing and backup tools are moved toward each other so as to compress the precursor between the tips 34 of protrusions 32 and the face 42 of the backup tool. The method of moving the embossing and backup tools together is not preferred. That is, either the embossing tool or the back up tool can be stationary and the other can be moved toward the stationary tool, or both embossing and backup tools can be mobile. In a typical installation, the backup tool is a plate, sheet or drum and the composite 20 is supported by the backup tool with the exposed inner face 21 in contact with working surface 42 of the backup tool. In such installation, the embossing tool 30 is a roll that rotates so as to force protrusions 32 into the fibrous outer layer and adhesive layers of the supported composite. Other conventional embossing machinery configurations can also be utilized.

The apparatus is set to provide a specified clearance at point of closest approach between the tips 34 and the working surface 42. The tools are held at this clearance dimension for a predetermined duration effective to create the three-dimensional texture of the fibrous outer layer and to laminate the composite layers. Then the tools are moved apart to release the textured product.

Protrusions 32 are spaced apart at positions on base 36 of the embossing tool corresponding to locations of desired depressed areas in the finished composite. The protrusions extend from the base toward the composite by a distance E. This distance and the clearance are sized and dimensioned to provide a desired penetration of protrusions 32 into the precursor such that the adhesive of layer 7 is activated at the protrusion tips. The fibers are simultaneously pushed into the activated adhesive by tips 34, thus anchoring the fibers within the depressed areas. Compression of the composite between the tips and the working surface causes adhesive to laminate the backing layer to the depressed areas which themselves anchor the fibrous outer layer. Distance E is also selected to assure that fibers and adhesive in the voids 38 between protrusions 32 do not excessively overheat and fuse together. Protrusions 32 can have sides 37 that align normal to the plane of the composite. As seen in FIG. 7, the protrusions preferably have tapered profiles that narrow away from the base 36 and render the protrusion frustoconical or truncated pyramidal in form. The tapered geometry facilitates the formation of adhesive clusters 10 that extend outward and upward from depressed areas 5 and which orient fibers of fibrous outer layer 2 in elevated areas 4 in a substantially z-direction as discussed above.

The tips 34 of the protrusions can have a variety of shapes. For example, they can be convex curved that tend to form crater-shaped depressed areas. Convex curved tips also facilitate formation of adhesive cluster fibers at the edges of the depressed areas and promote the z-direction orientation of the fibers in elevated areas 4. The tips can be shaped with cutting surfaces at the tip edges 35. Additionally, the tips can be sharply pointed or concave shaped. These configurations can facilitate perforation of the adhesive layer and sculpting of the backing layer as described below.

Figure 8:
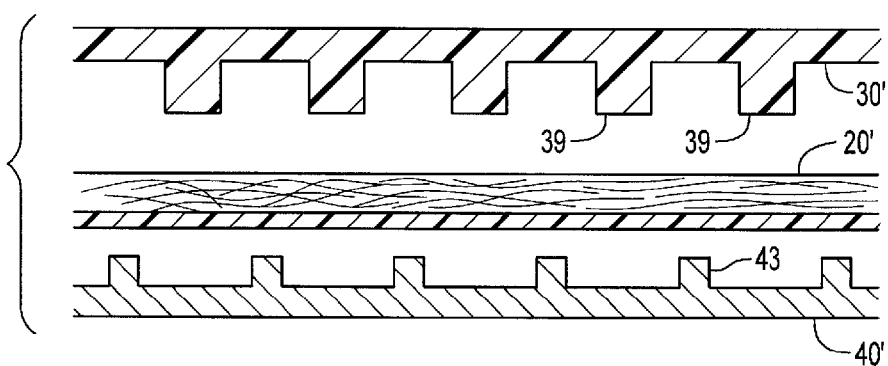
FIG. 8 is a cross-sectional view of a portion of another fabrication system suitable for embossing and/or laminating a textured composite material according to an embodiment of the present invention.

In order to create an undulating reverse side 15 of a two-layer composite (FIG. 2) or a three-layer composite having a thin backing layer, it can be helpful to provide a working surface on the backup tool that mates with the protrusions of the embossing tool in a complementary fashion. FIG. 8 schematically illustrates such a combination of embossing tool 30' and backup tool 40' which are juxtaposed on opposite sides of a two-layer composite precursor 20'. The backup tool has projections 43 which are so positioned as to bias against the reverse side of precursor laterally between the protrusions 39 of the embossing tool 30'. An undulating reverse side profile can alternatively be formed by using a flat working surface 42 (FIG. 7) provided that the working surface is composed of an elastically deformable substance such as rubber. Thus by appropriately adjusting the clearance between the embossing and backup tools, the protrusions of the embossing tool can force the composite into temporary depressions in the deformable backup tool during the embossing step. When the embossing tool retracts after embossing, the elastically deformable working surface of the backup tool recovers to its flat configuration while the composite retains its undulating profile such as seen in FIG. 2.

The embossing tool and/or the backup tool are maintained at a suitable elevated temperature such that the adhesive activates when touched by the tips of the embossing tool protrusions. However, the thermal processing equipment should not be heated to temperatures that approach the fusion point of the outer layer fibers. Such overheating can cause the fibers in the elevated areas to bond to themselves or deteriorate to an extent that the three-dimensional texture of the outer layer is lost. In contemplated variations of the process heat can be supplied from other sources in addition to the embossing tool. For example, the backup tool can be heated, or supplemental heat can be supplied from radiation or heated gas or heated surfaces impinging on the stacked layers prior to embossing. Preheating is preferably performed in a way that raises the temperature of the face layer, adhesive layer and backing layer, if any, to the highest level permissible by the shrinking or melting points of the components.

Prior to embossing, some heat and pressure can be applied to pre-combine the two or three layers, followed by the actual embossing step. During the pre-combining step, care should be used not to penetrate the entire face layer with adhesive and not to increase the density of the face layer excessively. For example, the adhesive layer can be pre-tacked by heat to the backing layer or alternatively to the face layer. Also, the adhesive layer can be needle-punched into the backing layer or alternatively to the face layer.

The operating variables such as temperature, exposure time, pressure, and depth of protrusions can be adjusted to control the degree to which adhesive melts and penetrates between fibers. Thus, when a thermoset adhesive is utilized, heat to activate the adhesive is applied during the embossing step for a time and a temperature selected to prevent this adhesive from setting before embossing is completed. When a thermoplastic adhesive is used, warping of the finished product is avoided by causing the textured composite to cool in a flat orientation.

The tip extension dimension E should be long enough that the protrusion tips extend through the uncompressed fibrous outer layer and contact the adhesive layer without causing heat from the base of the embossing tool to melt the fibrous material, activate low-melting components of the fibrous layer or otherwise thermally agglomerate or degrade the fibers in the elevated areas of the outer layer.

In accordance to an embodiment of the present invention, the protrusions of the embossing tool extend far enough that they penetrate through the adhesive layer and into the backing layer. This has the effect of pushing the depressed areas into the backing layer and compressing the backing layer beneath the depressed areas as seen in FIG. 5.

In another embodiment, central portions of the depressed areas are pushed aside by the embossing tool. This effect can be achieved by raising the temperature of the protrusion tips, forcing the protrusions deeper into the backing layer, providing protrusion tips with sharp cutting edges, using a compliant backup tool surface, and combinations of these techniques. A compliant back up tool can be formed from a suitably resilient, thermally stable material such as a silicon rubber. For example, embossing tool 90 shown in FIGS. 9 and 13 can be used with compliant back up tool 52, 54 shown in FIG. 13. With central portions pushed aside, the outer surface of the textured composite material has elevated areas, ring-shaped depressed areas and exposed areas of backing layer material within the depressed areas.

In still another embodiment, the protrusions extend completely through the backing layer and other optional layers so as to effectively perforate the textured composite.

By causing the protrusion tips to penetrate the backing layer to various depths, diverse color effects can be given to the finished composite. If the backing layer has a color that contrasts with the color of the fibrous outer layer, the contrasting color will show through the depressed areas to the top surface of the composite. More complex color patterns can be obtained by providing multiple strata 9', 9" and 9'" within the backing layer 9, shown in FIG. 3, or multiple backing layers, each of which have different colors. The fabrication process discussed above can cause the composite to exhibit a wide variety of different color patterns by selecting embossing protrusions that penetrate into different colored strata at correspondingly different depths.

The thermal embossing and laminating operation can be carried out batchwise, for example, using a platen press. This technique is useful for forming piece work textured composite such as sheets, panels and tiles. Alternatively, the heat embossing operation can be conducted in conventional continuous embossing equipment. For example, continuous embossing units provide for moving long webs of fibrous material, adhesive film and backing material simultaneously into the nip between constantly rotating embossing and back up rollers or belts. The rollers and belts are controlled to desired temperatures by conventional heating.

The novel textured composite materials are useful for covering environmental surfaces such as floors, walls, furniture and decorative objects. The three-dimensional texture of the fibrous outer layer provides an economical, abrasion resistant, dust-blocking fabric with a textile feel that can be made to simulate the appearance of loop-pile structures. With optional backing layer the composite has excellent cushioning characteristics and stability to thermal and humidity gradients, which render it well suited for many carpet applications. Inclusion of an optional breathable layer additionally provides excellent ventilation through the textured composite while maintaining impenetrability to liquids. Thus the novel textured composite material can attractively cover and protect its underlying substrate from adverse effects of liquid spills.

EXAMPLES

Set A

The present invention is now illustrated by a first Set A of examples of certain representative embodiments thereof, wherein all parts, proportions and percentages are by weight unless otherwise indicated. All units of weight and measure not originally obtained in SI units have been converted to SI units.

Example 1

Textured composite material according to an embodiment the present invention was prepared.

A series of textured composite materials was prepared using the following component materials. The fibrous outer layer was a needle-punched felt fabric made by carding and cross-lapping a 0.19 kg/m$^2$ (5.5 oz/yd$^2$) weight, 2.2 mm thickness felt of 3.8 cm (1.5 inch.) $1.7 \times 10^{-7}$ kg/m (1.5 denier) polyester fibers. Needling density was 46.5 penetrations/cm$^2$ (300 pen/inch$^2$). The adhesive layer material was a combination of two layers of black polyethylene utility film having a basis weight of 0.15 kg/m$^2$ (4.4 oz/yd$^2$). The backing layer was commercial carpet padding material of 0.88 kg/m$^2$ (26 oz/yd$^2$) of carded lapped fibers comprising 50% polyamide/50% polypropylene post consumer carpet waste. The fibers were garnetted, cross-lapped, and needled to form a backing layer having a thickness of 12.3 mm.

Figure 9:
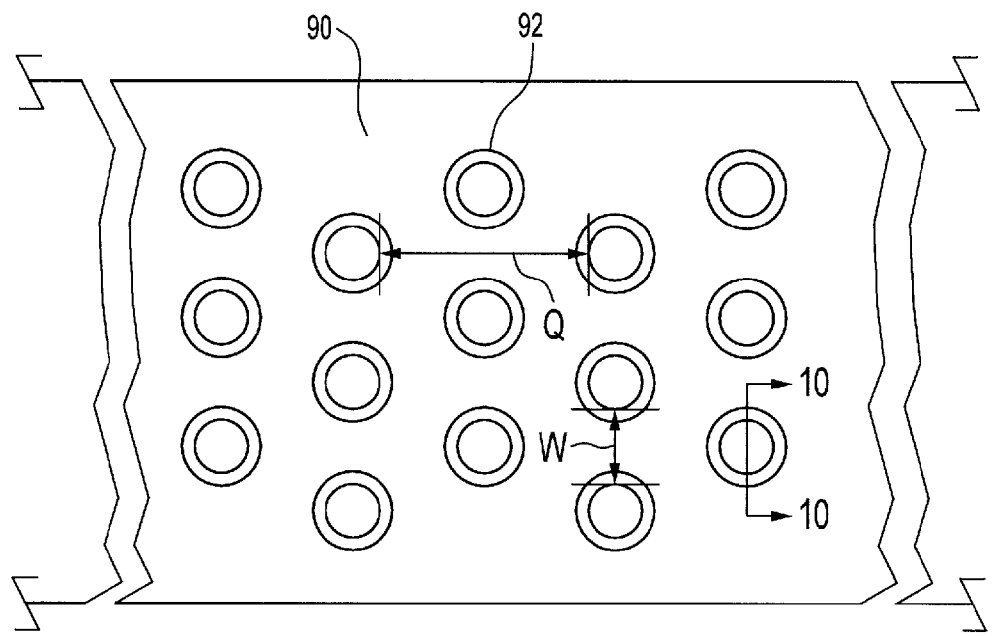
FIG. 9 is a top view of a portion of an embossing tool suitable for use with the present invention.
Figure 10:
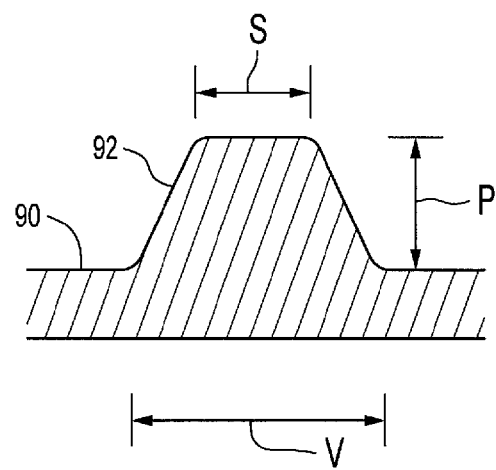
FIG. 10 is a cross-sectional view of a protrusion of the embossing tool of FIG. 9 as viewed along line 10-10.
Figure 11:
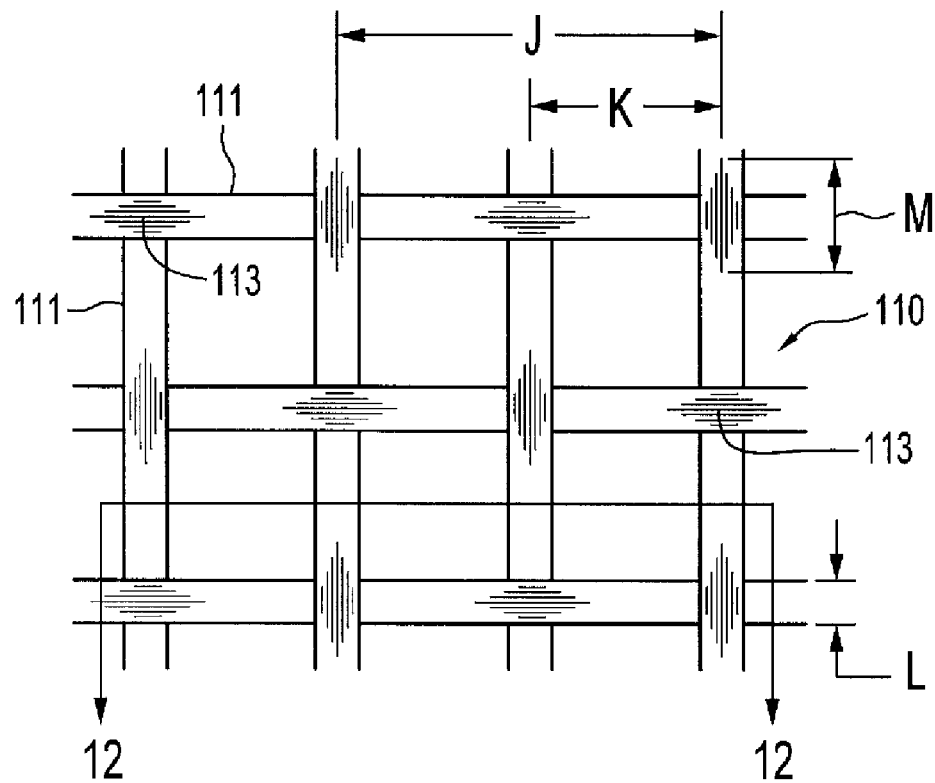
FIG. 11 is a top view of a portion of a wire mesh embossing tool suitable for use with the present invention.
Figure 12:
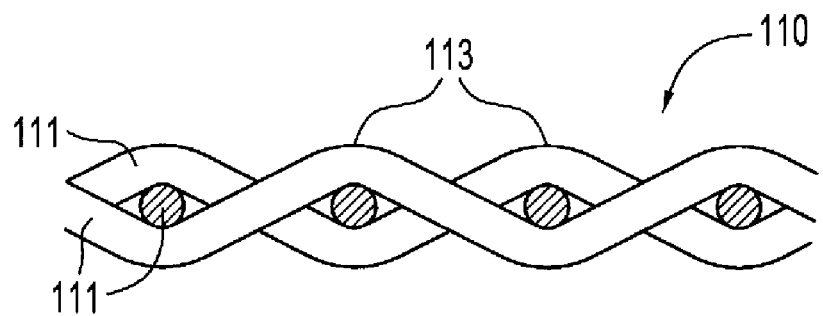
FIG. 12 is a detail cross-sectional view of the wire mesh embossing tool shown in FIG. 11 as viewed along line 12-12.

The composite material was formed by stacking in top-to-bottom order, the outer layer, adhesive layer and backing layer materials in a platen press. The press was equipped with a nickel upper embossing plate and a lower support plate. A diagram of a portion of the upper plate 90 is shown in FIGS. 9 and 10. The upper plate had frusto-conical protrusions 92 as shown in FIG. 10 and arranged in a staggered pattern as shown in FIG. 9. Dimensions and spacing of the protrusions were as follows: S=2.0 mm, P=1.5 mm, V=2.5 mm, Q=5.2 mm, and W=1.6 mm.

Pressure of 20.7 MPa (3000 psi) was applied to the platens by raising the bottom plate for a short time and then quickly lowering the bottom plate to allow cooling. Plate temperature, press time and other conditions utilized are presented in Table I.

TABLE I

| Ex. | Emboss Plate Temp. °C. | Backup Tool Temp. °C. | Time Sec. | Composite Thickness mm | Elevated area Thickness $T_f$ mm | Distance D mm | Ratio $D/T_f$ | Comment |
|---|---|---|---|---|---|---|---|---|
| 1A | 220 | 25 | 0.5 | 10 | 0.8 | 1.27 | 1.6 | Soft cushion feel similar to dense tufted carpet. Gray colored depressions |
| 1B | 220 | 25 | 1.0 | 6.4 | 0.7 | 1.40 | 2.0 | Slightly stiff feel. Dark gray colored depressions. |
| 1C | 220 | 25 | 2.0 | 2.5 | 0.6 | N.M.* | N.M* | Stiff feel, similar to dense vinyl tile. Perforated. |

N.M.* = Not measured

Samples 1A-1C demonstrate that the texture and feel of a three-component composite can be manipulated by duration of embossing. In this progression of samples, the embossing time was increased. As a result, the thickness of the completed composite was reduced and the feel became increasingly stiffer. Within the depressed areas (Ex. 1A) the black adhesive layer began to flow into the interstices between outer layer white fibers and thus produced a gray color. This effect increased in Ex. 1B and made the appearance of the depressed areas darker. The elevated areas remained white. In Ex. 1C the tips of the embossing protrusions penetrated completely through the adhesive layer to the backing layer. Accordingly, the central portions of the depressed areas were completely removed. Partial penetration of adhesive within the elevated areas gave these areas a light gray tone, although no adhesive reached the peak of the elevated areas.

Example 2

Textured composite material having a breathable, i.e., liquid permeation resistant, vapor transmissive barrier layer was produced.

Samples of textured composite material were prepared from the following materials. The fibrous outer layer was composed of 0.14 kg/m² (4.2 oz./sq. yd.) weight Xymid® Style 1817 stitch bonded fabric (Xymid LLC, Petersburg, Va.). This fabric comprises Reemay® spunbonded polyester style 2024 which had basis weight of 0.07 kg/m² (2.1 oz./sq. yd.) and which was chain-stitched with 3.54 stitches per cm (9 counts per inch) of 14 gauge textured nylon yarn. This fabric is easily deformable at temperatures over 100° C. The stitches of textured nylon yarn are stretchable by at least 50% elongation with or without application of heat.

The adhesive in Example 2A was Griltex-4 polyamide powder (EMS Company, Switzerland) of 200-500 μm particle size and having a melting point of 105° C. The powder particles were deposited at a density of 0.051 kg/m² (1.5 oz/sq. yd.) on a breathable layer of a web of meltblown polypropylene microfibers. The powder was sifted onto the web without infiltrating the web, and thereby, not blocking the breathable layer. The microfiber web consisted of about 0.6 to about 0.1 denier fibers and has a basis weight of about 3 oz/yd² available from Mogul Fabrics (Gaziantep, Turkey). The backing layer was the same as that in Example 1.

The materials were assembled and processed as described in Example 1 with exceptions that will be noted. The operating conditions and results are shown in Table II. The pressure of the platen press during embossing was 13.8 MPa (2000 psi). The structure of the composite was as shown in FIG. 6.

TABLE II

| Ex. | Emboss Plate Temp. °C. | Backup Tool Temp. °C. | Time sec. | Composite Thickness mm | Elevated area Thickness $T_f$ mm | Distance D mm | Ratio $D/T_f$ | Comment |
|---|---|---|---|---|---|---|---|---|
| 2A | 170 | 25 | 0.5 | 11.4 | 0.95 | 1.27 | 1.3 | Full bonds in depressed areas, partial bonds in elevated areas |
| 2B | 220 | 25 | 0.5 | 11.4 | 0.80 | 1.27 | 1.6 | Full bonds in depressed areas, no bonds in elevated areas |
| 2C | 220 | 220 | 0.5 | 12.7 | 0.80 | 1.27 | 1.6 | Full bonds in depressed areas, no bonds in elevated areas |

In Ex. 2A well formed bonds in the depressed areas were evident. The composite was sufficiently well laminated that the layers could not be peeled apart without destroying the layers. In the elevated areas, the powdered adhesive melted partially and penetrated the outer fibrous layer without reaching the upper surface of the fibrous outer layer. Despite this partial penetration, the breathable layer remained vapor permeable. Breathability was determined by providing a Mason jar having a two-part lid formed by a peripheral screw top and a removable flat disk. The disk was perforated. With the lid removed, 5 g of water was placed in the jar. A 7.6 cm (3 inch) diameter sample of the composite was then laid on the perforated disk and the peripheral portion of the top was screwed onto the jar over the disk/sample, thereby sealing the sample over the mouth of the jar. The jar was maintained at room temperature for 72 hours and the difference in weight before and after the test was measured. A weight loss of 0.1 g was deemed evidence that the sample permeated water vapor and was therefore breathable. A weight loss of 0.7 g was observed for sample 2A.

Although permeable to vapor, the sample was resistant to water flow through the composite. Water flow resistance was determined by placing an approximately 2.54 cm (1 inch) diameter sample piece to be tested against the rubber washer in a 1.9 cm (¾ inch) diameter female connector of a common garden hose. A male garden hose connector attached to a section of hose was screwed into the female connector which clamped the sample across the lumen and thus to block flow through the hose. The assembled apparatus was oriented vertically and a 25.4 cm (10 inch) high column of water was placed in the hose on top of the sample. The apparatus was positioned over a sheet of dry blotting paper. The sample was deemed to be impenetrable to liquid if the sheet was dry after 0.5 hour of testing.

Alternatively, the liquid impermeable layer can also be gas impermeable.

Example 2B repeated 2A except that the polyamide adhesive powder was eliminated and two layers of the polypropylene fiber web of total weight of 0.20 kg/m² (6 oz./sq. yd.) were used. Also the upper platen plate temperature was increased to 220° C. The fibrous outer layer was well bonded to the polypropylene breathable layer and the textured composite exhibited good delamination resistance by peel testing, i.e., the composite separated within layers but not at the interface between layers when pulled apart by hand. This demonstrates that the breathable layer can also serve the purpose of the adhesive layer. The low melting copolymer of the Reemay fabric was fully fused in the depressed areas and the fabric maintained its original fiber form with no evidence of melting or shrinking in the elevated areas. Liquid penetration and vapor transmission were similar to that seen in Ex. 2A.

Example 2C was conducted identically to Ex. 2A except that a web of 2.5 cm long Type K glass staple fiber was added to the underside of the backing layer, and the bottom platen plate was heated to 220° C. The finished composite of Ex. 2C was similar in appearance to that of Ex. 2B.

Rigidity and dimensional stability tests were performed on Exs. 2B and 2C by the following methods. Rigidity was determined by cutting a 2.54 cm×20.3 cm (1 inch×8 inch) strip from a sample of the composite to be tested. The strip was clamped to a horizontal surface, such as a table top, in a way that about 5 cm (2 inches) of the sample overlapped the surface and the remaining about 15 cm (6 inches) extended freely beyond the surface in cantilever fashion. The vertical deflection at the free end of the sample, i.e., the vertical distance of that the end drooped below the elevation of the horizontal surface was measured. Ex. 2B had a rigidity deflection of 5 mm and exhibited doming of 3-4 mm and cupping of 1-2 mm. Ex. 2B had a rigidity deflection of 2 mm and approximately zero doming and cupping. Retesting all Examples 2A, 2B and 2C showed negligible doming or cupping. This was attributed to relaxation of stresses with time versus the first tests conducted immediately after lamination.

Example 3

Multiple stage embossing is used to produce a varied color composite material.

Materials used to produce composite materials were as follows. The fibrous outer layer was white Reemay® type 2040 polyester spunbonded fabric, basis weight 0.14 kg/m² (4 oz./sq. yd.). This fabric is thermally moldable above 100° C. The adhesive was the same as that in Ex. 1. The backing layer was a 0.68 kg/m² (20 oz./sq. yd.) resilient felt formed from carded, cross-lapped and needle-punched polyester staple fiber at 23.2 penetrations/cm (150 pen./inch) per side using 7.6 cm long $16.6 \times 10^{-7}$ kg/m (15 denier) per filament. The backing layer was about 0.95 cm (⅜ inch) thick. This backing layer material was stained red by contacting one side with a commercial red dye dissolved in water and then dried in and oven at 130° C. to set the dye. The dye penetrated to about one third of the thickness of the layer. The same staining procedure was performed on the opposite side of the backing layer using a dark green colored dye.

The composite structure was assembled in the platen press as in the previous examples except that three patterning plates were provided. Plate A had 30 round protrusions per cm² (196/sq. inch), and is further defined by the values for pattern dimensions in FIGS. 9 and 10 as follows: Q=2.6 mm, W=0.8 mm, S=1 mm, V=1.25 mm, and P=1 mm (40 mil). Plate B had the same embossing pattern dimensions as in Ex. 1. Plate C, illustrated schematically in FIGS. 11 and 12, was a plain weave metal screen 110 woven from 8 gauge wire 111. The screen 110 had elongated protrusions 113 alternating at 0 and 90 degrees positioned as shown in the figures with dimensions as follows: J=6.35 mm (0.25 inch), K=3.2 mm (0.125 inch), L=1.5 mm (0.06 inch), M=3.0 mm (0.120 inch) and N=2.5 mm (0.10 inch). The composites were formed by pressing the plates together with pressure of 48.2 MPa (7000 psi) at conditions shown in Table III.

The sample of Ex. 3A was first embossed with plate A for 1.5 seconds to produce an intermediate finished composite material with 0.89 mm deep depressed areas. Because of the blending of the fused adhesive with the fibers, the recessed areas took on a gray color while the fibers in the elevated areas remained white. Then the sample was re-pressed for an additional 1.5 seconds with plate B substituted for plate A. This produced a superimposed pattern of deeper depressed areas. The protrusions penetrated into the backing layer and exposed dark red color in the more deeply depressed areas while the areas not touched by plate B retained colors produced by the initial pressing. See Table III.

The sample of Ex. 3B was prepared by repeating the two stage pressing procedure of Ex. 3A. Then the sample was re-pressed a third time for 1.5 seconds with plate C in the press. The third pressing formed still more deep depressed areas that penetrated farther into the backing layer and exposed dark brown color where the protrusions of plate C penetrated.

TABLE III

| Ex. | Emboss Plate Temp. °C. | Backup Tool Temp. °C. | Time sec. | Plate | Composite Thickness mm | Embossment Thickness $T_f$ mm | Distance D mm | Ratio $D/T_f$ | Comment |
|---|---|---|---|---|---|---|---|---|---|
| 3A | 220 | 25 | 1.5 | A | 8.90 | 0.35 | 0.89 | 2.2 | Depressed areas gray |
|    |     |    | 1.5 | B |      |      | 1.0  | 3.0 | Depressed areas dark red |
| 3B | 220 | 25 | 1.5 | A | 7.6  | 0.35 | 0.76 | 2.2 | Depressed areas gray |
|    |     |    | 1.5 | B |      |      | 1.02 | 3.0 | Depressed areas dark red |
|    |     |    | 1.5 | C |      |      | 1.87 | 6.0 | Depressed areas dark brown |

Example 4

Operating conditions are varied to show that adhesion and textile composite face designs can be affected by suitably adjusting control variables.

For the samples produced in this example, the fibrous outer layer was an upholstery fabric of a blend of 70% nylon and 30% cotton spun yarns with a 7.9 warp/cm×7.9 weft/inch (20×20) weave. The basis weight was 0.41 kg/m$^2$ (12 oz./sq. yd.) and thickness was about 1 mm. The adhesive layer was black polyethylene film of basis weight 0.11 kg/m$^2$ (3.2 oz./sq. yd.). The backing layer was the same as in Ex. 1. In all samples of Example 4, the embossing plate temperature was maintained at 200° C.

Sample 4A is a comparative example, which was produced using the same platen pressing process as in Ex. 1 with Plate A in the embossing position. Pressing was for a short time and under moderate pressure as presented in Table IV. Although the depressed area fibers anchored well into the adhesive layer, the composite was capable of delamination by hand peel test without excessively tearing up the surface of the backing. Sample 4B repeated the procedure of sample 4A except that the underside of the fibrous outer layer was manually sanded with about 10 reciprocating strokes using 60-grit sandpaper such that the surface was roughened. After pressing, the composite had the same good bulk and appearance characteristics as sample Ex. 4A and the backing layer could not be delaminated from the outer and adhesive layers without seriously damaging the outer layer or the backing layer.

To make sample 4C, Ex. 4A was repeated but deeper penetrating plate B was utilized. Thus the depressed areas anchored the outer layer more deeply into the composite than Ex. 4A. Without roughening the underside of the outer layer starting material, the composite had good cohesive strength to withstand delamination. That is, it could not be delaminated without damaging the outer or backing layers.

Ex. 4D was performed using the shallower protrusions of plate A and without sanding the underside of the outer layer before pressing. However, the press pressure was increased and the support plate was heated. This product did not delaminate without damaging the outer or backing layers.

In Example 4E the adhesive layer was eliminated. To compensate for lack of an independent adhesive layer, the deeper penetrating embossing plate (plate B), high pressure and longer pressing time were used. These conditions were sufficient to cause the polypropylene fibers within the backing layer to bond the fibers of the fibrous outer layer within the depressed areas. This product did not delaminate.

TABLE IV

| Ex. | Plate | Emboss Pressure MPa | Backup Tool Temp ° C. | Time sec. | Composite Thickness mm | Embossment Thickness $T_f$ mm | Distance D mm | Ratio $D/T_f$ | Comment |
|---|---|---|---|---|---|---|---|---|---|
| 4A | A | 20.7 | 25 | 0.5 | 10.2 | 0.5 | 0.76 | 1.52 | Delaminated |
| 4B | A | 20.7 | 25 | 0.5 | 10.2 | 0.5 | 0.76 | 1.52 | Not Delaminated |
| 4C | B | 20.7 | 25 | 0.5 | 10.2 | 0.5 | 1.29 | 2.58 | Not Delaminated |
| 4D | A | 138 | 220 | 0.5 | 7.6 | 0.4 | 0.89 | 2.22 | Not Delaminated |
| 4E | B | 138 | 220 | 1.5 | 5.1 | 0.4 | 1.40 | 3.50 | Not Delaminated |

Example 5

Figure 13:
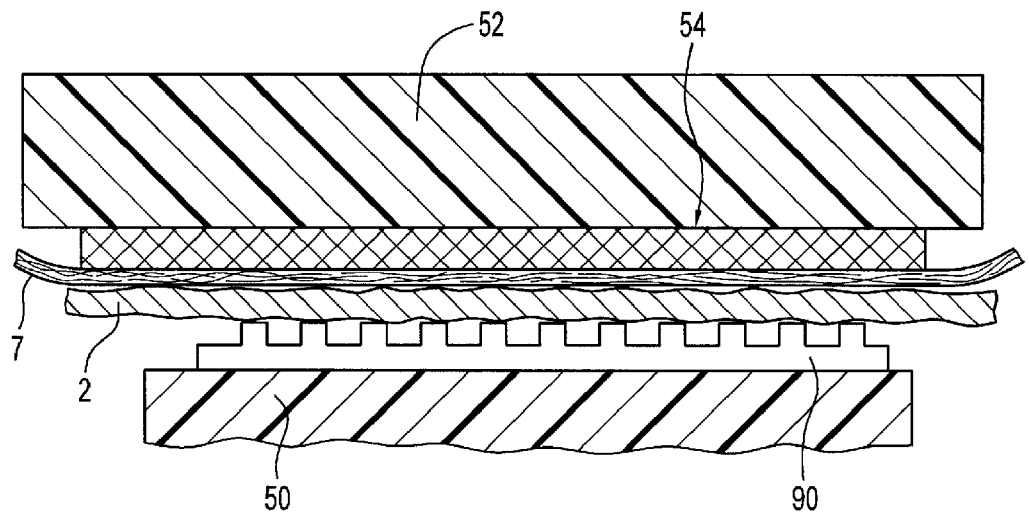
FIG. 13 is a cross-sectional view of a portion of a fabrication system suitable for embossing and/or laminating a textured composite according to an embodiment of the present invention.

Textured composite materials according to an embodiment the present invention were prepared, as illustrated in FIG. 13. As shown, the orientation of the composite and the embossing tool is reversed to the orientation shown in other Figures. The present invention covers any orientation during the manufacturing process, and the present invention is not limited to any orientation shown herein. The optional backing layer is omitted in this Example.

Fibrous outer layer 2 was a nonwoven fabric made from carded and cross-lapped 1.5 denier/1.5 inch semi-dull staple polyester fibers and needle-punched with a relatively high needling density of about 155 penetrations per square centimeter (or 1000 penetrations per square inch). This needling density was significantly higher than the needling density of the fibrous outer layer in Example 1.

Adhesive layer 7 was a black polyethylene film. Two basis weights of the adhesive layer, 0.6 oz/sq. yd and 2.0 oz/sq. yd., were used.

The embossing plate of Example 1 having depth of protrusion P of 1.5 mm was also used to prepare samples for this Example, except that the embossing plate 90 was mounted on the bottom press platen 50. The upper press platen 52 had a silicon rubber sheet 54 mounted on its surface. Two rubber sheets, 1 mm thick and 2 mm thick, were used. The bottom platen was heated to about 220° C. and the upper platen was unheated and kept at about 25° C. The fibrous outer layer was positioned to be contacted by the heated bottom platen and the adhesive layer was positioned to be contacted by the unheated upper rubber platen. Pressure of about 3,000 psi was applied to the platens.

TABLE V

| Ex. | Adhesive Film (oz/yd$^2$) | Time (sec) | Rubber Backup Tool (mm) | D (mm) | $T_f$ (mm) | Ratio D/$T_f$ | Y (mm) | Density Y (g/cm$^3$) | Comment |
|---|---|---|---|---|---|---|---|---|---|
| 5A | 0.6 | 0.5 | 2 | 1.1 | 0.8 | 1.4 | 0.25 | 0.8 | Adhesive anchored but did not fully embed fibers in depressed areas. Good surface stability. |
| 5B | 0.6 | 1.0 | 2 | 1.2 | 0.7 | 1.7 | 0.20 | 1.0 | Similar to Ex. 5A with less flexibility. |
| 5C | 0.6 | 2.0 | 2 | 1.3 | 0.6 | 2.2 | 0.20 | 1.0 | Molten adhesive pushed through the depressed areas, turning these areas gray. Good surface stability. |
| 5D | 2.0 | 2.0 | 2 | 1.4 | 0.7 | 2.0 | 0.25 | 1.0 | Molten adhesive pushed through the depressed areas. Activated adhesive partially bonded with the surface of the fibrous outer layer under elevated areas. |
| 5E* | 2.0 | 3.0 | 2 | 1.4 | 0.5 | 2.8 | 0.20 | 1.3 | COMPARATIVE. Molten adhesive penetrated throughout the outer layer. |
| 5AA | 0.6 | 0.5 | 1 | 1.0 | 0.9 | 1.1 | 0.25 | 0.8 | Similar to Ex. 5A, except that the adhesive film shrunk and broke apart under elevated areas. |
| 5BB | 0.6 | 2.0 | 1 | 1.1 | 0.8 | 1.4 | 0.20 | 1.0 | Similar to Ex. 5AA. |
| 5DD | 2.0 | 2.0 | 1 | 1.3 | 0.8 | 1.6 | 0.20 | 1.3 | Similar to Ex. 5D, except that there was no partial bonding under the elevated areas. |
| 5EE | 2.0 | 3.0 | 1 | 1.4 | 0.8 | 1.3 | 0.20 | 1.3 | Similar to Ex. 5DD, except that longer time duration allowed partial surface bonding under the elevated areas. (FIG. 14). |

Fibrous outer layer 2 was embossed with the embossing platens of this Example using either of the rubber sheets on the back up tool. While the fibrous outer layer was embossed without the adhesive, the embossed layer had limited surface stability, and fibers could be readily raised from the surface by hard hand rubbing.

In Ex. 5A, within the depressed areas of the composite the fibers were well anchored in the adhesive layer, without being fully embedded therein as illustrated by reference number 56 in FIG. 14. The top 58 of elevated areas remained white indicating that the black adhesive had not been pushed through the white outer layer. Within the elevated areas, the elevation distance, D, was 1.1 mm and the thickness of the fibrous layer, $T_f$, was 0.8 mm. Hence the ratio of D/$T_f$ is greater than 1.25, indicating that the two-layer composite of this Example has an undulating shape, as shown in FIG. 14. Furthermore, the adhesive layer under the elevated areas was loose or unattached to the outer layer, as shown by reference number 60. The composite sample was surface stable, soft and flexible, and the fibers would not be raised by handrubbing. The thickness of the depressed areas "Y" was 0.25 mm, leading to a calculated density of the depressed areas being about 0.8 gram/cm$^3$.

Ex. 5AA was prepared similarly as Ex. 5A, except that the thinner silicon rubber sheet (1 mm) was used. The composite sample produced was well embossed with slightly less depth D and higher bulk in the elevated areas. The adhesive film under the elevated areas shrunk and broke apart as illustrated by reference number 62.

Ex. 5B was prepared similarly as Ex. 5A, except that duration that the embossing tool applies heat and pressure to the precursor was longer. The composite sample produced was embossed deeper (D=1.2 mm) and had less bulk ($T_f$=0.7 mm) in the elevated areas. The depressed areas were thinner and denser. The molten adhesive remained below the surface of the composite and the top surface of the composite remained white. The sample was somewhat less flexible than Exs. 5A and 5AA, but was still very soft and surface durable.

Ex. 5BB was similarly prepared as Ex. 5B, except that the thinner silicon rubber sheet (1 mm) was used and the time duration was longer. The composite sample produced was similar to Ex. 5B, but with slightly shallower depth D and the adhesive film under the elevated areas shrunk and broke apart as illustrated by reference number 62.

Ex. 5C was similarly prepared as Ex. 5B, except that the time duration is longer. The composite sample produced was similar to Ex. 5B, except that the molten adhesive penetrated through the depressed areas turning the depressed areas gray as illustrated by reference number 64. The sample had good surface stability.

Ex. 5D was similarly prepared as Ex. 5C, except that the thicker adhesive film was used. Same result was produced as Ex. 5C. The adhesive was partially bonded with the surface of the outer layer under the elevated areas as illustrated by reference number 66. The outer surface of the elevated areas remained free of activated adhesive and soft.

Ex. 5DD was similarly prepared as Ex. 5D, except that the thinner silicon rubber sheet (1 mm) was used. The thinner rubber allowed the heavier adhesive film to remain un-bonded to the surface of the fibrous outer layer as illustrated by reference number 60.

Ex. 5EE was similarly prepared as to Ex. 5DD, except that longer time duration allowed partial bonding under the elevated areas as illustrated by reference number 66. In FIG. 14, the outer surface of the elevated areas remained free of activated adhesive and soft.

Ex. 5E* was the comparative example and outside of the present invention. Due to thicker adhesive, longer duration and thicker rubber backing tool, the molten adhesive flowed through the fibrous outer surface.

In all the inventive examples except comparative example 5E*, the exposed fibers in the elevated areas were free of activated adhesive. Preferably, depth D exceeds thickness $T_f$, and the density of the depressed areas exceeds 0.7 gram/cc. The molten adhesive penetrated through the depressed areas in some cases but not in other cases. All inventive samples are surface stable and have soft textile feel.

the back side or bottom of the backing layer formed by one of the heated platens, and $T_{all}$ is the total thickness of the composite measured from a peak on an elevated area to the skin on the bottom of the backing layer. Y is the depth of adhesive penetration within the depressed areas (see page 9). The density of Y (last column) is calculated using this thickness and the combined weight of fibrous layer and adhesive layer. The presence of backing, if any, within this thickness Y is ignored in this calculation.

TABLE VI

| Ex. | Time (sec) | D (mm) | $T_f$ (mm) | Y (mm) | S (mm) | $T_{all}$ (mm) | Ratio $D/T_f$ | Density Y (g/cm³) | Comment |
|---|---|---|---|---|---|---|---|---|---|
| 6A | 0.5 | 1.2 | 0.6 | 0.30 | 0.2 | 8.0 | 2.0 | 0.85 | Adhesive did not penetrate through the depressed areas. Adhesive film remained unattached to the outer layer under the elevated area. Composite is surface durable and has soft feel. |
| 6B | 1.0 | 1.3 | 0.6 | 0.25 | 0.3 | 4.0 | 2.2 | 0.93 | Similar results as Ex. 6A. |
| 6C | 2.0 | 1.4 | 0.5 | 0.20 | 0.3 | 2.0 | 2.8 | 1.20 | Adhesive penetrated through the depressed areas. Top of elevated areas remained white. Composite is surface durable and has soft feel. (FIG. 16). |
| 6D* | 4.0 | 1.4 | 0.4 | 0.20 | 0.4 | 2.0 | 2.8 | 1.20 | COMPARATIVE. Molten adhesive penetrated throughout the outer layer. |

Example 6

Optional backing layer 9 is added to any of the inventive examples illustrated in Example 5. More specifically, the optional third backing layer is a needled batt topped with an adhesive film integrated into the batt during the manufacturing process.

Fibrous outer layer 2 is a nonwoven fabric made from carded and cross-lapped 1.5 denier/1.5 inch white staple polyester fibers and needle-punched with a relatively high needling density of about 155 penetrations per square centimeter (or 1000 penetrations per square inch) on both sides for more durability. The basis weight is about 5.5 oz/sq. yd. and thickness is about 0.8 mm.

Adhesive layer 7 is a polyethylene film having a basis weight of about 2 oz/sq. yd. Backing layer 9 is a blend of 65% of 15 denier per filament/3 inch polyester staple fibers, and 35% of 2 denier per filament/1.5 inch polypropylene staple fibers. The blend is carded, cross-lapped and mechanically needled from one face with about 62 penetrations per square centimeter (or 400 penetrations per square inch) onto the adhesive film. The total basis weight is about 24 oz/sq. yd, including the film. It is noted that the finer polypropylene fibers were pushed through the thickness of the backing in large numbers creating a "furry" surface over the adhesive film. The coarser and tougher polyester fibers stayed mostly within the plane of the backing.

Figure 15:
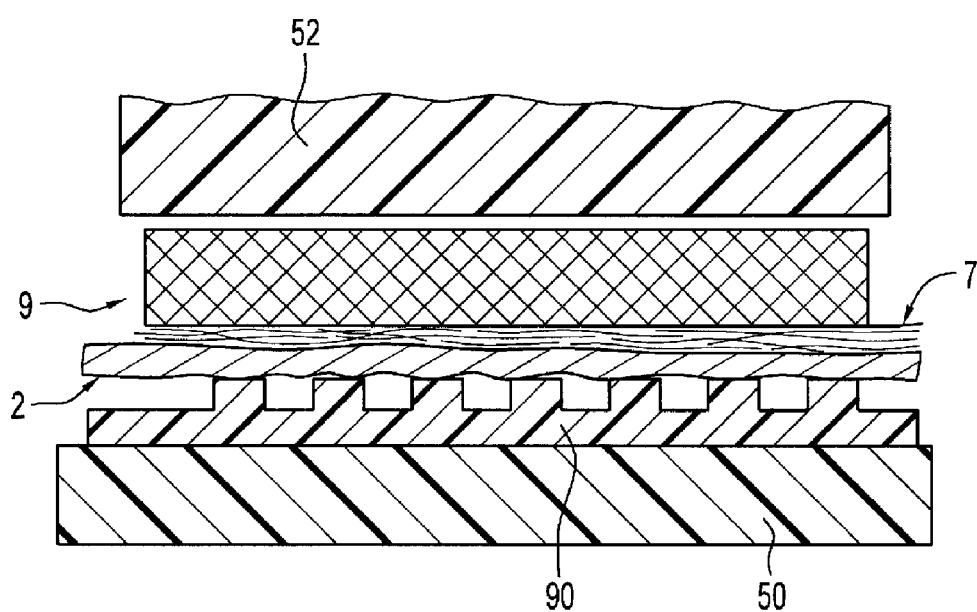
FIG. 15 is a cross-sectional view of a portion of a fabrication system suitable for embossing and/or laminating a textured composite according to an embodiment of the present invention.

As shown in FIG. 15, the embossing plate of Example 1 having depth of protrusion P of 1.5 mm is also used in this Example, except that the embossing plate 90 is mounted on the bottom press platen. Bottom platen 50 is heated to about 220° C. and upper platen 52 is heated to about 180° C. Fibrous outer layer 2 is positioned to be contacted by the heated bottom platen and backing layer 9 is positioned to be contacted by the heated upper platen to stabilize the back side of the batt. Pressure of about 3,000 psi was applied to the platens. As illustrated in FIG. 16, Z is the thickness of the skin on In Ex. 6A, heat was applied for a short period of time. The protrusions penetrated 1.2 mm and the fibers were well anchored in the adhesive layer, without being fully embedded therein. The top of depressed areas remained white indicating that the black adhesive had not been pushed through the white outer layer. The adhesive film remained loose or unattached to the outer layer under the elevated areas. The fibers on top of the depressed areas were free of activated adhesive. The composite was surface durable and had a soft feel.

Ex. 6B was prepared similarly to Ex. 6A, except that the time duration under heat and pressure was longer. The composite sample was stiffer than Ex. 6A, and remained soft and surface durable. The adhesive did not penetrate through the depressed area.

Ex. 6C was exposed to heat and pressure even longer. Activated adhesive penetrated through the depressed areas. The elevated areas remained white. The composite sample remained soft and surface durable.

Ex. 6D was the comparative example and was exposed to the longest to heat and pressure. Activated adhesive penetrated through most of the fibrous outer layer. This comparative example is outside of the present invention.

Figure 17:
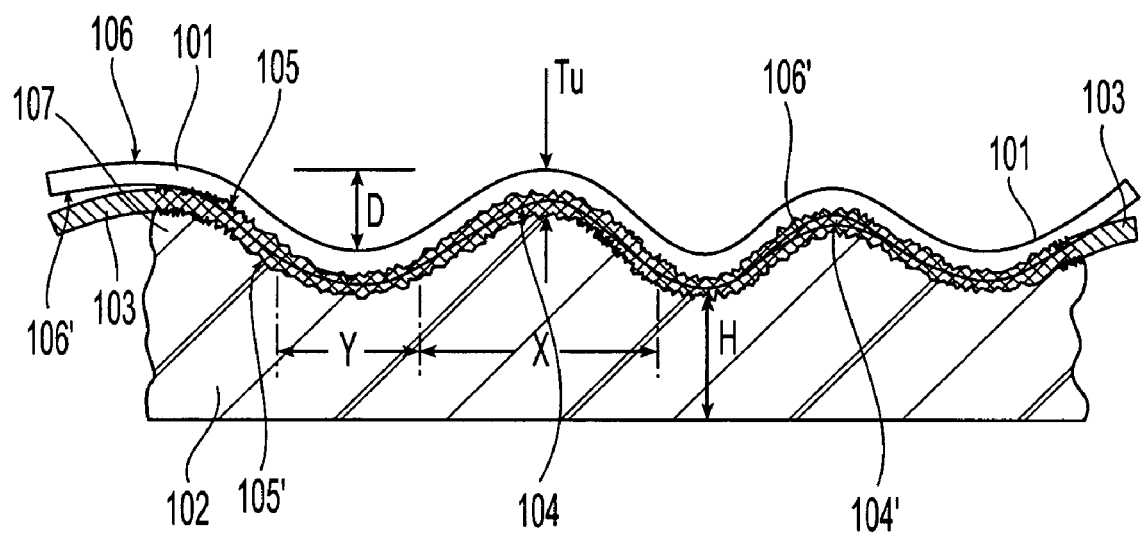
FIG. 17 is a cross-sectional view of a textured composite material according to an embodiment of the present invention having a backing layer with a substantially flat bottom surface.

FIG. 17 depicts diagrammatically and in general terms the three-layered textured floorcovering composite, which is the subject of the present invention. It comprises a highly-conformable fibrous outer layer 101 and a resilient backing layer 102, that are continually, contiguously, or continuously attached with adhesive layer 103 along a three-dimensional, undulating interface 104 (without spaces between the face layer and backing layer), or along interface 104' (with minor spaces filled with adhesive). The undulations correspond to depressed and elevated areas on the surface of the composite. Such a composite can be fabricated if its precursor is subjected to heat and pressure for a longer period of time compared to the composites of the '470 and '186 applications, preferably over 10 seconds, provided that the applied pressure is relatively low, preferably under about 200 psi. This embodiment preserves the advantages offered by textured composites described in the '470 and '186 applications, but it adds several innovative features that allow the textured composite to be used as a floorcovering that advantageously resists warping (e.g., distortion of the composite out-of-plane due to differential expansion or contraction between individual layers when the composite is subjected to planar stresses), and remains insensitive to variations in ambient temperature and humidity, including exposure to water.

One added feature required by this invention is that the depressed areas descend to a larger depth (D), measured from the top of the outer layer 101 at the elevated areas to the top of the outer layer 101 at adjacent depressed areas, that equals or exceeds a thickness ($T_u$), measured from the top of the outer layer 101 at the elevated areas to either the (i) bottom of the adhesive layer 103, or (ii) the interface of the outer layer 101 and backing layer 102 at the elevated areas. The relationship $D \geq T_u$ ensures that the integrated outer layer 101 and adhesive layer 103 undulate in unison as depicted in FIG. 17. Further, this feature allows the depressions between the arched or looped segments, which are continuously or continually attached to the backing 102 throughout, including the depressed areas, to descend below the height of the interface of face-layer and backing at the adjacent elevated areas, so that they can "flex" laterally (expand and contract laterally within the plane of the composite rather than bulging upwards with contractive forces or resist expansion with tensile extension forces), unless they are impeded by a stiff and non-conforming backing.

The ratio $D/T_u$ can be greater than or equal to about 1, greater than or equal to about 1.25, preferably greater than or equal to about 1.5, greater than or equally to about 1.75, or greater than or equal to about 2.0.

Figure 18:
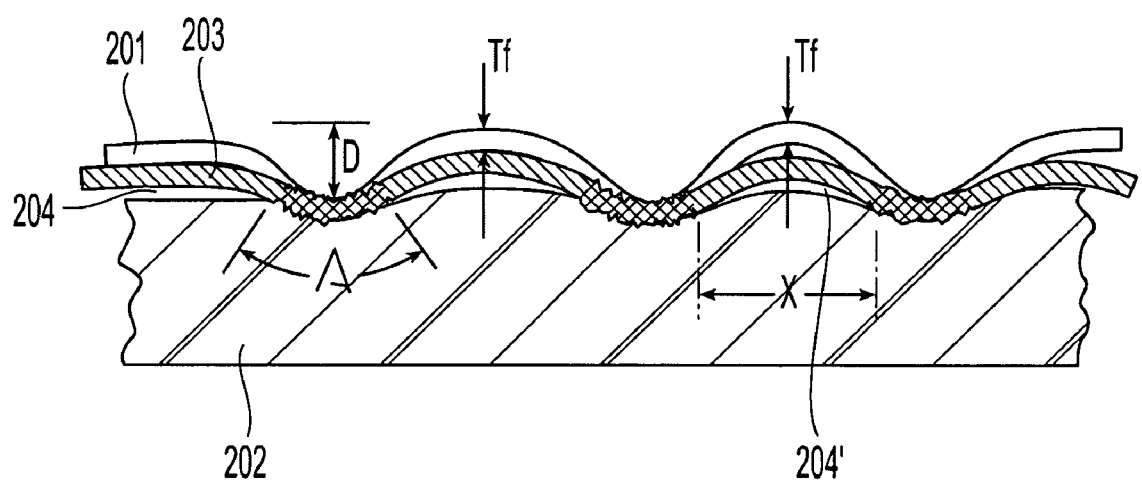
FIG. 18 is a cross-sectional view of a textured composite material as shown in the '470 parent application.

A second added feature is that the backing layer 102 has a minimum resilient depth H, at least 2 mm below the interface of the outer layer 101 and the backing layer 102, and a compressibility higher than about 10% with a load of 20 psi. Such a resiliently compressible backing layer 102 allows the face structure 101 to "flex" laterally, thereby allowing the redistribution of stresses created by planar mechanical extension or contraction or by differential expansion or contraction between the layers with changes in temperature or humidity. Depth H is measured from the interface of the face layer and backing layer at the depressed areas. At these areas the face and backing are usually compressed into full contact. In cases wherein these two layers are separated by adhesive, dimension H should be measured from a depth equidistant between the face layer and backing layer. It should also be noted that for the embodiments described in the '470 and '186 applications, as depicted in FIG. 18, it was sufficient for depth D above depth H to exceed a thickness ($T_f$) of fabric above the adhesive layer at the elevated areas, because the adhesive layer was not fully integrated with the fibrous outer layer and the backing layer throughout. Furthermore the backing did not have to reach any particular depth, or to be highly conformable or compressible to allow lateral flexing of the face layer, because at the elevated areas there was negligible, if any, attachment to the backing, except for example 5EE discussed above.

A third added feature is that the depressed areas extend a lateral distance Y, which is less than about 10 mm between adjacent elevated areas, in order to avoid excessively wide flat spans susceptible to warping or bulging as a result of lateral stresses due to temperature and humidity fluctuations. As also described by the '470 and '186 applications, the elevated areas extend a distance X, which is between about 10 and about 1.5 mm between adjacent depressed areas, to avoid warping of the composite if these spaces are exceedingly wide, or to avoid overcrowding of the depressions, as well as to provide space for undulations if they are too narrow.

Figure 29A:
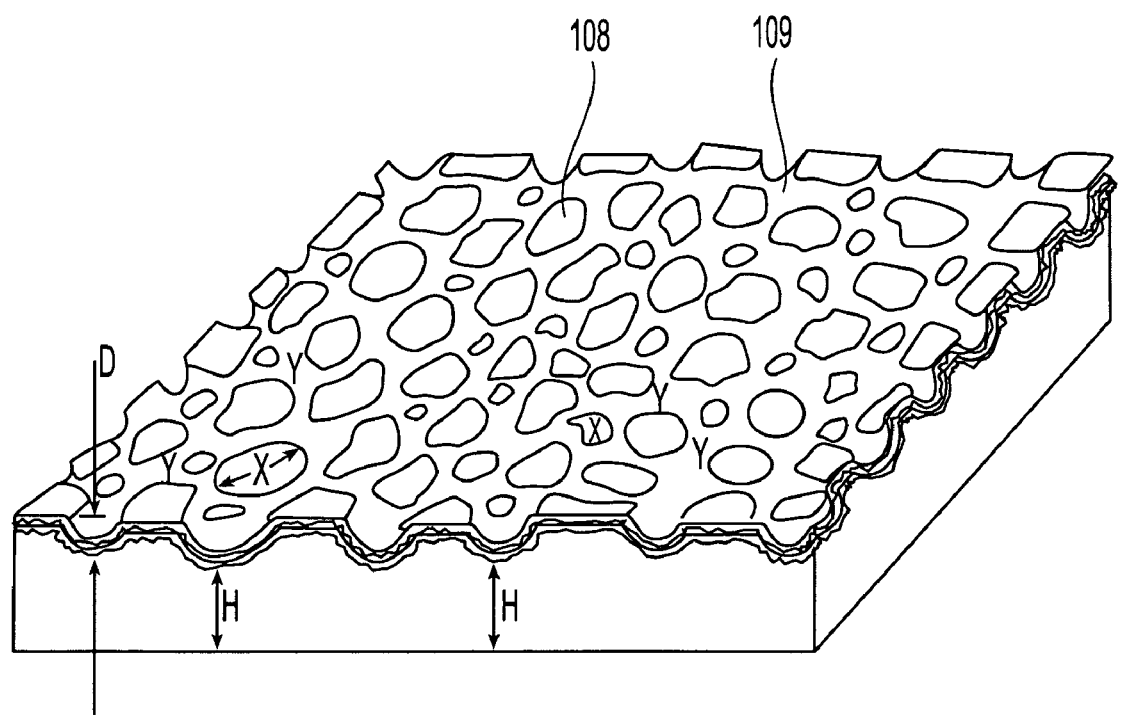
FIG. 29A-29C are three-dimensional views of a textured composite material according to different embodiments of the present invention.
Figure 29B:
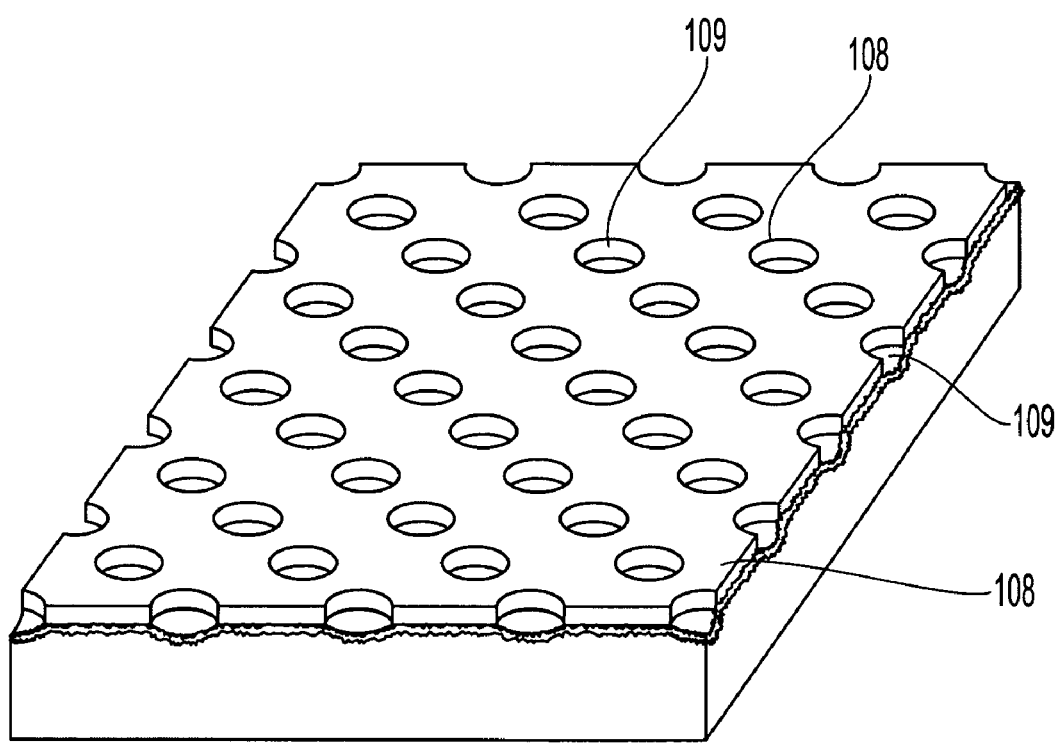
Figure 29C:
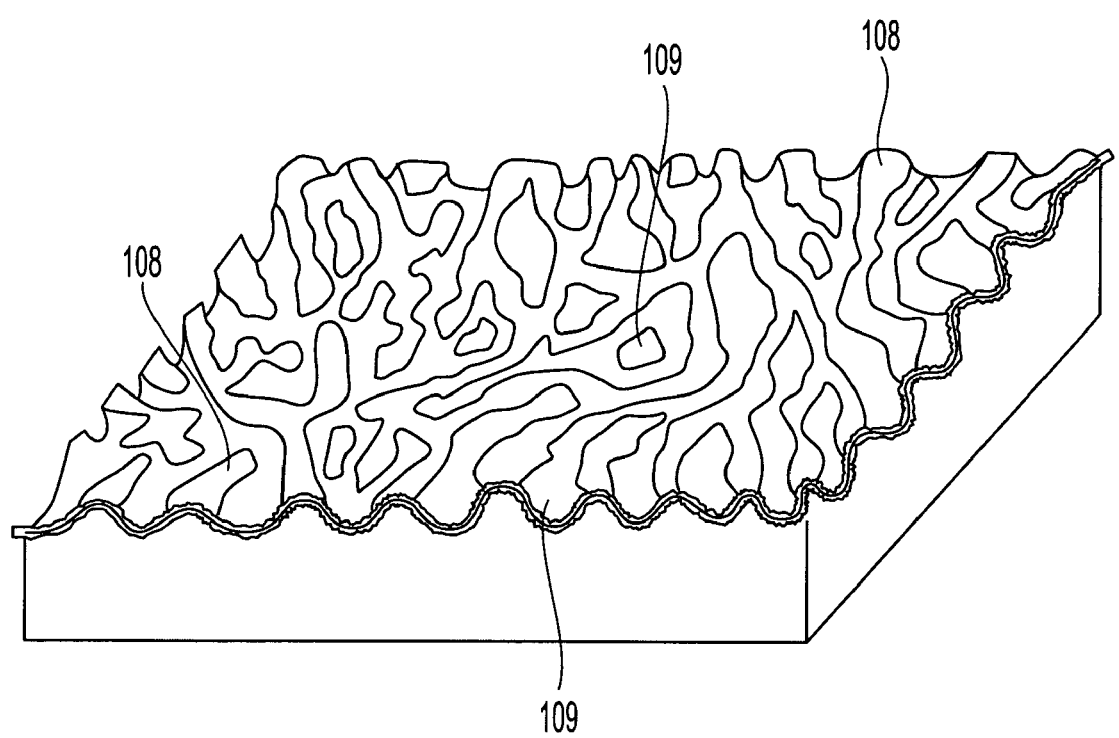

An optional fourth added feature is that the undulations occur topographically within all cross-sections taken in any direction, thereby helping to ensure that stress relief occurs in all directions. As seen in FIG. 17, the adhesive penetration contour 105 into the fibrous outer layer 101, the adhesive penetration contour 105' into the backing layer, the upper and lower faces 106 and 106' of the fibrous outer layer, the upper face 107 of the backing layer, and the interfaces 104 and 104' of outer layer and backing layer undulate in unison, ascending and descending simultaneously, at every cross section in all directions, for the purpose of accommodating differential stresses, in all directions. FIGS. 29A-29C provide three-dimensional, topographical views of an undulating textured composite according to different embodiments of the present invention. FIG. 29A is a textured composite material comprising isolated elevations 108 and continuous depressions. FIG. 29B is a textured composite material comprising isolated depressions 109 and continuous elevations. FIG. 29C is a textured composite material comprising isolated and continuous depressions and elevations.

For the embodiment described in FIG. 17, it should also be noted that adhesive may or may not rise to the top of the depressed areas, as discussed in the '470 application. In general, with the non-apertured outer fabric layers used most-frequently in this invention, it does not.

The fabrication processes suitable for the embodiment described in FIG. 17 involve various surface-texturing methods. The depressed and elevated areas are both necessarily densified by the texture-forming action, which usually involves pressure-embossing. When the composite is formed by embossing during lamination or after lamination (as in the embodiments described in FIGS. 22, 23, 24, and 25), a relatively low pressure of under about 200 psi, preferably under about 100 psi, is applied. Under these conditions the depressed areas are densified more than the elevated areas. When the face layer, or face layer and adhesive layer, are embossed before the backing is added (as in the embodiments in FIGS. 26 and 27) the level of densification within the elevated and depressed areas of the final composite will vary. It may be equal throughout the surface area, or the density of either of the two areas may be higher than the other area. By contrast, in all of the embodiments of the '470 parent application, illustrated diagrammatically in FIG. 18, the textured composites are embossed at relatively higher pressures in the range of about 2,000 to 7,000 psi. Such relatively higher pressures are used for the purpose of locally and intermittently "anchoring" the layers at the depressed areas, within generalized span A, by adhesive, which may or may not rise to the surface at the depressed areas. Within the depressed areas the density rises significantly over the density along the rest of the surface area. The remainder of the interface of outer layer 201 and backing layer 202 is generally not densified and the face layer and backing are separated by adhesive layer 203, wherein the adhesive layer penetrates only the outer layer, as indicated at location 204, or it does not penetrate either layer, as indicated at location 204'.

The combined density of the fibrous outer layer and the adhesive layer in the depressed areas is preferably less than about 0.7 g/cm³. Alternatively, said density may be greater than about than about 0.7 g/cm³ as stated in the '470 parent application.

The textured composite, described herein, resists warping without the preferred stiff sub-surface reinforcements of structures such as those disclosed in WO 1999/019557, U.S. Pat. No. 5,965,232, WO 2002/102582, U.S. Pat. No. 7,064, 092. The textured composite's length or width deflects out-of-plane by less than 4%, preferably less than 2%, and most preferably less than 1% with temperature and humidity variations encountered under normal flooring use. By contrast, many conventional planar fabric composites can develop a bumpy terrain caused by so-called "doming" and "cupping," which are induced by changes in temperature and humidity.

Figure 19:
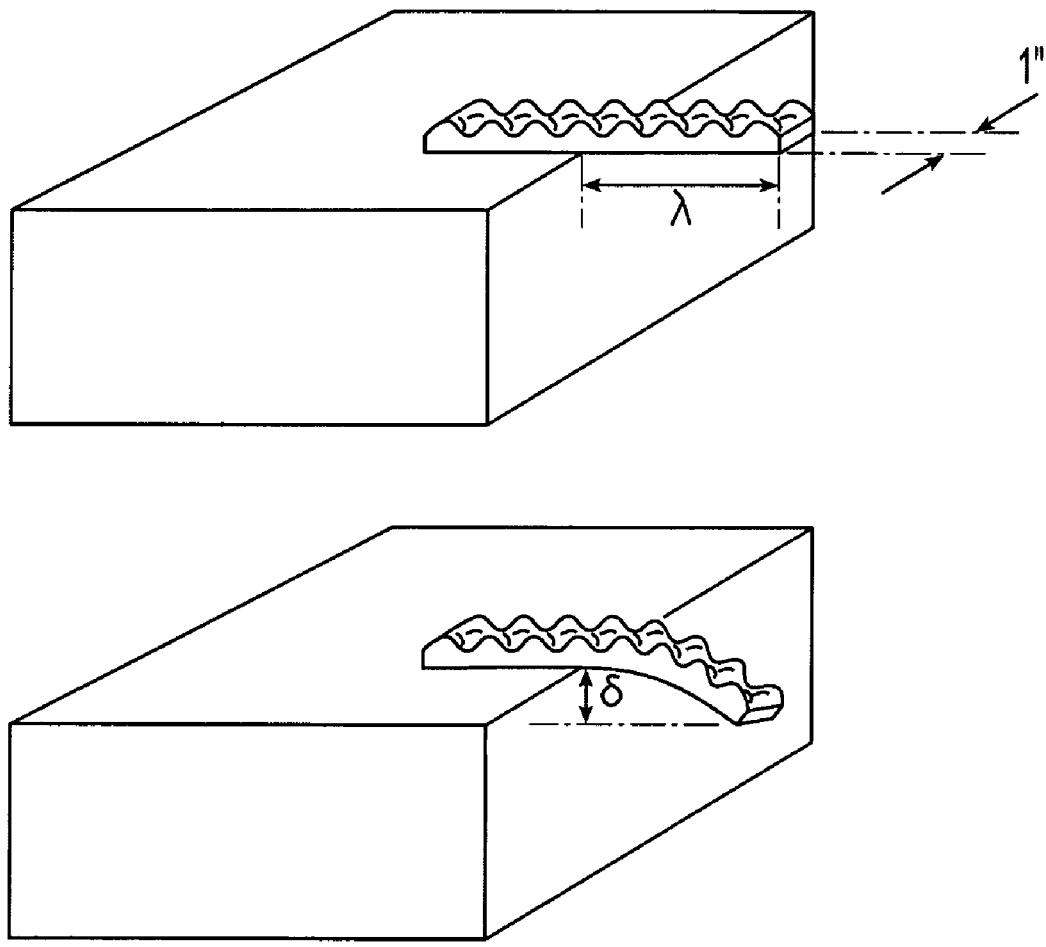
FIG. 19 schematically illustrates a bending length test for a textured composite material according to an embodiment of the present invention.

To allow handling during installation, either as a "tile" or "broadloom" carpet, the composite preferably has a bending length ratio of at least about 5/1. Such a bending length ratio allows the inventive floor coverings to remain flexible but relatively flat and non-drapeable, so that they do not easily bend or deform during installation and exposure to traffic. The bending length ratio is a measure of the interaction between the composite weight and stiffness, which is measured by employing the principle of cantilever bending of the composite under its own weight. As schematically illustrated in FIG. 19, the bending length ratio is measured by sliding an inventive sample in a direction parallel to its long dimension, so that its leading edge extends a distance λ over the edge of planar block. The inventive sample is then allowed to sag to a depth δ for one minute at 25 degrees C. For the bending length test illustrated in FIG. 19, λ=5 inches and δ≦1 inch, and the inventive sample is 1 inch wide.

The floorcovering of this invention meets the minimum floor covering durability standard with a rating of 2.0 after about 5,000 Vetterman cycles as measured according to ISO 10361. Preferably, the floorcovering product receives a minimum rating of 2.0 after 20,000 cycles, and most preferably a minimum rating of 2.0 after 30,000 cycles. Such a rating was measured using an abrasion resistance test, which closely correlates to floor trafficking, that was conducted with a Vetterman drum test apparatus. The drum is lined with test samples into which is placed a 7.3 kilogram (16 pound) steel ball which rolls randomly inside the rotating drum. The Vetterman drum test apparatus has a speed of about 17 revolutions per minute or 1000 revolutions per hour, and it reverses direction every 100 revolutions. After about 5000 revolutions, the samples are removed and inspected to evaluate appearance retention. Abrasion resistance is reported on a scale of 1-4 with a rating of 4 indicating no perceptible face damage, a rating of 3 indicating moderate deterioration, a rating of 2 indicating visible but acceptably small facial deterioration, and a rating of 1 indicating unacceptable abrasion.

An inventive composite meeting the above requirements generally weighs between about 25 oz/yd$^2$ and about 100 oz/yd$^2$, and has an overall thickness of at least about 2.5 mm. The backings useful in this invention have a basis weight ranging from between about 15 oz/yd$^2$ and about 80 oz/yd$^2$.

As depicted in FIG. 20, multiple face sublayers, such as 401, 401', and 401", can be combined to form the entire outer face layer. The combined sublayers are continually or continuously bonded to the backing with adhesive layer 403. The sublayers are also inter-bonded to each other with adhesive layers 403' and 403". They can also be thermally inter-bonded without added intermediate adhesive, or otherwise mechanically interconnected by stitching, needling and other similar processes. The outer sublayer 401 is a durable fabric as required by this invention, while the other sub-layers, 401', 401", etc. can be membranes, films, or other similar materials. The added sublayers can have functions including antimicrobial or bactericidal properties, fire or flame resistance, water blocking, electrical conductivity, and other similar properties. All sub-layers should be highly conformable and moldable. These layers can be built with materials have relatively high thermal and expansion coefficients and high propensities to expand or shrink with variations of humidity, without the danger of causing the composite to warp, because the stresses created by such variations are accommodated within their final undulated three-dimensional configuration.

As depicted in FIGS. 21A-21B, below depth H, one or more sublayers, such as sublayers 502' and 502" can be optionally attached to the backing layer 502, which can increase the bending stiffness of the composite or improve other composite properties such as the abrasion resistance of the backside of the backing layer 502, adhesion to the floor or release from the floor, blocking of moisture or water, cushioning, and other similar properties. FIG. 21A illustrates that interconnected or inter-bonded flat backing sublayers 502' and 502" can be deployed below the required elastically compressible depth H. They may serve as water-blocking layers, stiffeners, providers of extra cushion, or other similar functions. The construction and materials of the sub-layers 502' and 502" should not allow them to expand or contract to a significant degree and overpower the upper backing layer as temperature and humidity varies. Flat or mildly textured or mildly undulating sublayers 502' and 502" of this type should be constructed with materials having low coefficients of expansion (e.g., glass), or materials that are easily expandable or compressible within the plane of the floorcovering (e.g., foam rubber).

Alternatively, as illustrated in FIG. 21B, the sublayers 502' and 502" can be undulated in the manner of the face layer 502 to absorb expansion and contraction within their contours. More specifically, sublayers 502' and 502" may be textured and undulating in the same manner as the face 501 and adhesive layer 503, and consequently capable of minimizing planar expansion or contraction by flexing the arches or loops formed by the embossing action. Such sublayers 502' and 502" can be attached to the backing 502 before the face layers 501, or during the lamination of the face 501, adhesive 503 and upper backing 502, or after the main composite is formed.

Figure 22A:
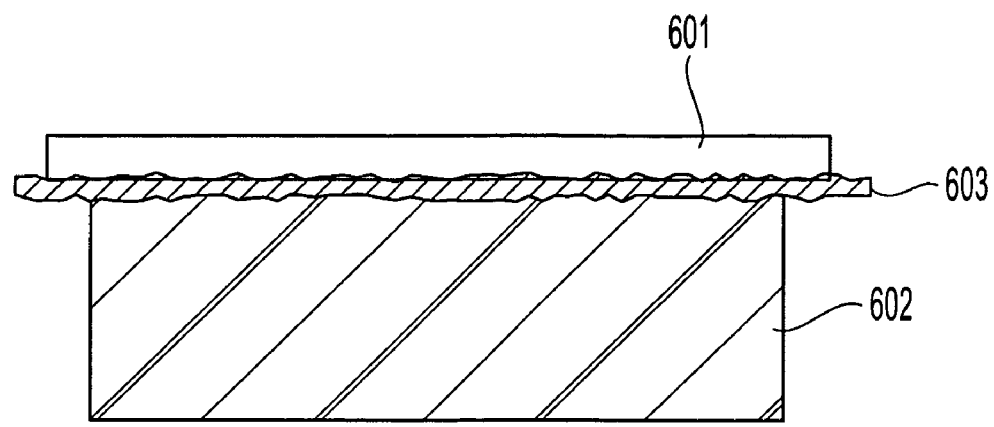
FIGS. 22A-22C are a sequence of cross-sectional views illustrating a process for laminating then embossing a textured composite material according to an embodiment of the present invention.
Figure 22B:
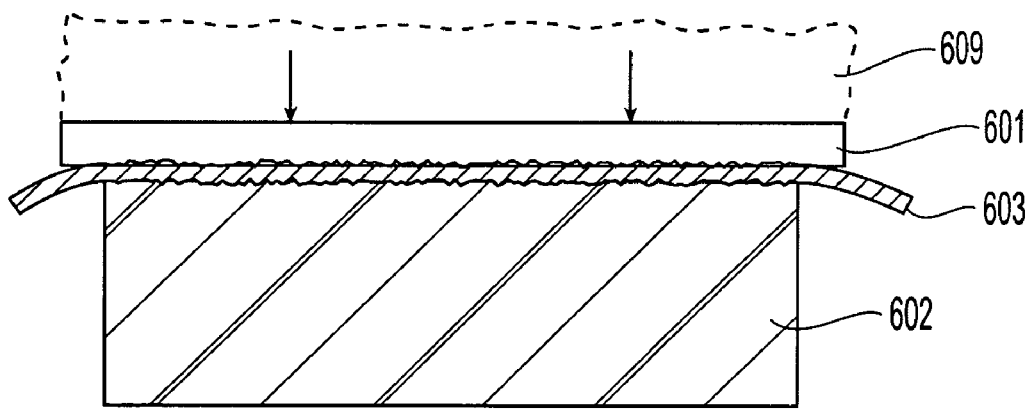
Figure 22C:
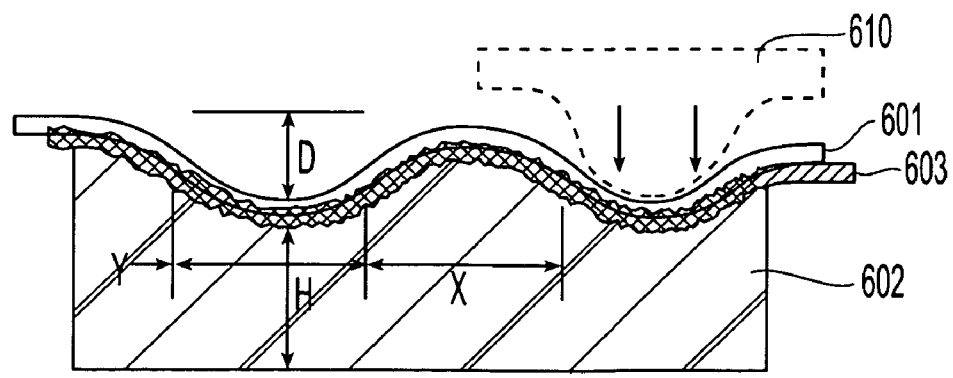
Figure 23A:
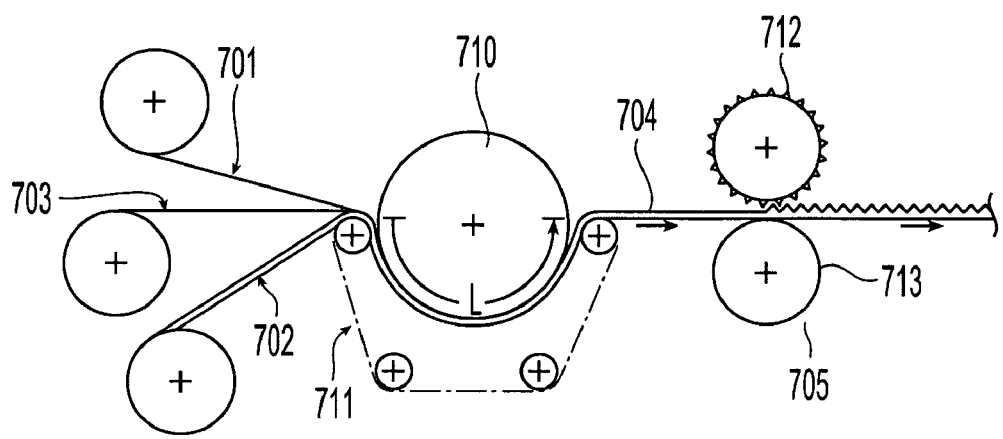
FIGS. 23A and 23B are cross-sectional views of two different fabrication systems suitable for laminating then embossing the textured composite material shown in FIGS. 22A-22C.
Figure 23B:
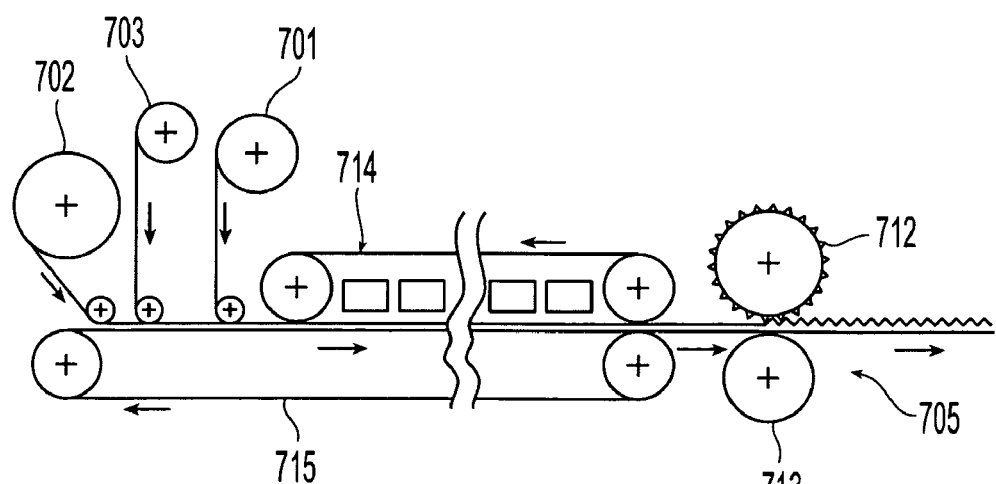

The floor coverings of this invention can be prepared using several methods which allow economical process speeds. As depicted in FIGS. 22A-22C, one manufacturing process comprises pre-laminating a fibrous outer layer 601, a thermoplastic adhesive layer 602 and a backing 603, followed by post-embossing with a heated tool applied against the fabric face. As depicted in FIGS. 23A-23B, pre-lamination is performed with equipment applying low pressure for a finite period of time, followed by embossing.

As depicted in FIGS. 24A-24C and FIGS. 25A-25B, a second method involves simultaneous lamination and embossing of a fibrous outer layer 901, adhesive layer 902, and backing layer 903 by holding the three layers against a heated patterned surface under low pressure for a finite period of time.

As depicted in FIGS. 26A-26C and FIGS. 27A-27B, a third alternative process includes the pre-forming of an omni-directionally undulated fibrous outer layer 1001, with or without an attached adhesive layer 1003, 1003', and subsequently forming the backing 1002 on the backside.

Returning now to FIG. 17, fibrous outer layer 101 is a highly conformable and moldable fabric, which can be deeply embossed or textured with heat and pressure. Suitable fabrics include wovens produced with elastically or inelastically extensible yarns; elastically-gathered or shrunk wovens; relaxed warp-knits or circular knits; stitchbonded products with high extensibility including gathered products stitched with elastic or partially-oriented yarns which gather the sheet when the stitched yarns shrink; stitchbonded products with stitching patterns allowing high area stretch; warp knits and circular knits with stitch patterns allowing very high extensibilities; nonwovens bonded, needle-punched or spunlaced without restricting their stretchability; and the like. A particularly advantageous feature of the fibrous outer layer 101 of this invention is that it can comprise antimicrobial elements within a relatively small thickness. Consequently, it can be very effective as an antimicrobial floorcovering compared with pile structures, wherein dirt can proceed under the exposed surface and bacteria can breed at the roots of the pile, even if the pile is formed with or contains antimicrobial fibers.

Adhesive layer 103 can also be provided with antimicrobial properties within a very small depth. Adhesive layer 103 can comprise materials selected from a wide group of thermoplastic materials that melt at temperatures well below the melting or decomposition temperatures of fibrous outer layer 101, i.e., at least 15 to 50 degrees C. below the melting point or the decomposition point of the fibrous outer layer 101, or from thermoset materials which set at similar temperatures. A particularly effective thermoplastic adhesive is low density polyethylene, which melts at approximately 70-100 degrees C. below the melting or decomposition point of the most common face fibers. Polyethylene can also be heated significantly above its melting temperature without decomposing. Polyethylene also flows well, and it bonds well to most fibers.

The adhesive layer 103 can be pre-attached to or incorporated within the fibrous outer layer 101, or it can be attached to the surface of backing layer 102, if a substantial portion of its surface area is open towards the adjacent layer. Permissible pre-attachment techniques include light needle punching for attaching the adhesive layer 103 to the fibrous outer layer 101 or backing layer 102, and stitchbonding for pre-attaching the adhesive layer 103 to the fibrous outer layer 101 in a manner exposing the majority of the adhesive surface to the backing layer 102. Stitchbonded alternatives include those disclosed in U.S. Pat. No. 6,936,327 (incorporated herein by reference in its entirety), wherein a shrinkable adhesive layer is pre-integrated into the face layer by stitchbonding. Simpler structures, wherein the stitchbonded fabric is not shrinkable or does not shrink and yet exposes the majority of the adhesive layer on the side facing the backing, are also suitable. Additional adhesive layers 103 can also be optionally placed between the backing 102 and the fibrous outer layer 101.

Backing layer 102 is recoverably compressible and sufficiently deep to provide cushion and to allow lateral stresses to be absorbed by the "flexing" of the arches or loops of the face layer 101 in a manner analogous to a spring. If a textured composite is formed by embossing the fibrous outer layer, the adhesive layer, and the backing layer simultaneously, as in the case of FIGS. 22A-22C, 23A-23B, 24A-C and 25A-25B, the backing layer should also be plastically compressible at elevated temperatures so that it conforms and assumes a deep and permanent surface texture. Since most of the undulated face layers 101 suitable for this invention have an overall depth in the range of about 1-3 mm, the softly resilient backing 102 necessarily extends for an additional depth H under the depressions equaling at least 2 mm, within which it can recoverably be compressed at room temperature by at least 10% under a stress of 20 psi.

When a textured composite is formed, as in FIGS. 22A-22C, 23A-23B, 24A-C and 25A-25B, wherein the three layers are prefabricated and superposed, particularly suitable backings are needlepunched felts containing polyesters or polyamides. Such backings preferably contain at least some relatively high deniers, usually over 10 decitex, optionally blended with lower-melting fibers such as polyethylene or polypropylene. Thermoplastically bonded layers using other low-melting fibers or bicomponent low-melt/high-melt fibers, or compressed particulates and fibers, or foamed layers, are also suitable.

When the textured composite is formed by building the backing onto the backside of a pre-embossed face layer or onto a pre-embossed combined face/adhesive layer, as per FIGS. 26A-26C and 27A-27B, the backing is either formed by foaming, or by depositing fine interbonded particles onto the backside of the pre-embossed face layer, or by using a combination of foam and fine particles. In this case, permanent thermal embossability for the backing is not preferred, although the need for soft and elastically recoverable compressibility for a depth H of at least 2 mm remains preferred.

As noted above, the floorcoverings of this invention can be prepared using several methods. One method is schematically depicted in the sequence of FIGS. 22A-22C. As depicted in FIG. 22A, a thermoplastic adhesive layer 603 is first superposed between outer layer 601 and backing layer 602. Next, as depicted in FIG. 22B, the three layers 601, 602, 603 are pre-laminated by applying even and low pressure for a finite period, under heat, to the outer layer 601 using a flat tool 609. For the most common outer layer materials, such as nylon and polyester, which are combined with lower melting adhesive layer materials such as polyolefins, the temperature is raised above about 150 degrees C., usually to about 200 degrees C., with pressures between about 20 and 200 psi, preferably under about 100 psi, for a time interval between about 10 and 60 seconds, usually between about 20 and 40 seconds. Higher temperatures could be used with fibers such as aramids. Subsequently, as depicted in FIG. 22C, the composite of FIG. 22B is embossed with a patterned heated tool 610. Embossing temperatures need to be in the same range as lamination temperatures, whereas embossing pressures can be significantly higher, provided that time under pressure is limited by using a calender 705, as in FIGS. 23A and 23B. The calender 705 could be replaced with heated patterned drum 916 or heated patterned belt 919, depcited in FIGS. 25A and 25B, in which case the pressures should be lowered as time under pressure is extended. The calender can also be replaced with a press, wherein embossing pressures and time can be counterbalanced to achieve the desired results, with higher pressures paired with longer compression times and vice versa.

FIGS. 23A and 23B shows diagrams of two different fabrication systems suitable for laminating then embossing the textured composite material in a continuous operation, according to the sequence shown in FIGS. 22A-22C. FIG. 23A shows the use of a smooth heated drum 710, wrapped by belt 711, with a continuous wrapping arc L exerting continuous low pressure to achieve simultaneous controlled propagation of the thermoplastic adhesive 703 into the face layer 701 and into the backing layer 702 without excessively compressing the layers. The pre-laminated composite 704 is then conveyed to embossing calender 705, equipped with patterned heated roll 712 and smooth back-up roll 713. The calender can be replaced with an intermittently-operating press in a less-continuous mode of operation (not shown). FIG. 23B shows an equivalent set of continuously-operating equipment, using a dual-belt laminator with heated belt 714 and low-temperature belt 715, pre-laminating the three layers prior to embossing.

Figure 24A:
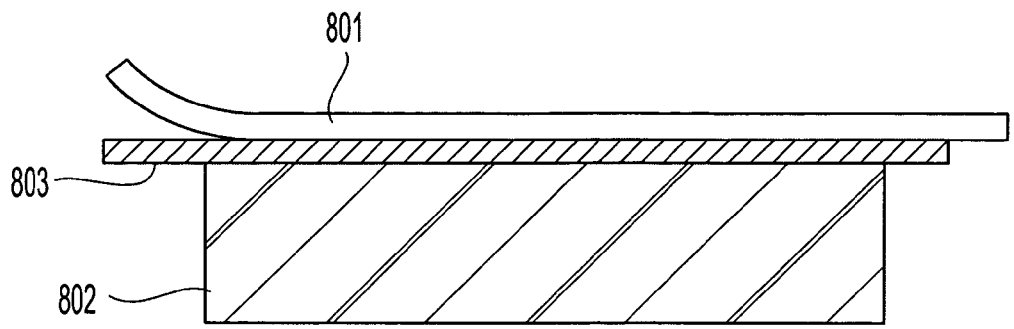
FIGS. 24A-24C are a sequence of cross-sectional views illustrating a process for simultaneously laminating and embossing a textured composite material according to an embodiment of the present invention.
Figure 24B:
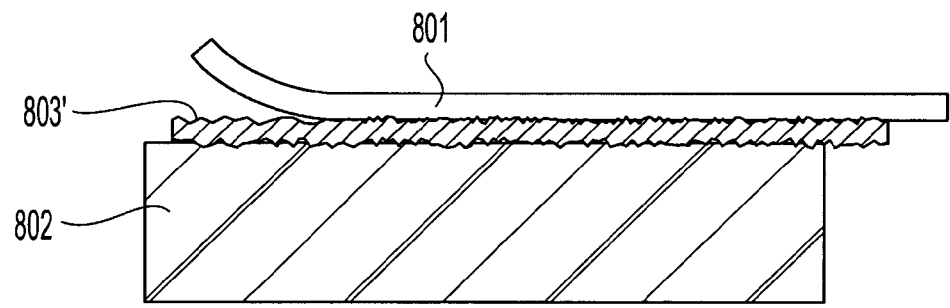
Figure 24C:
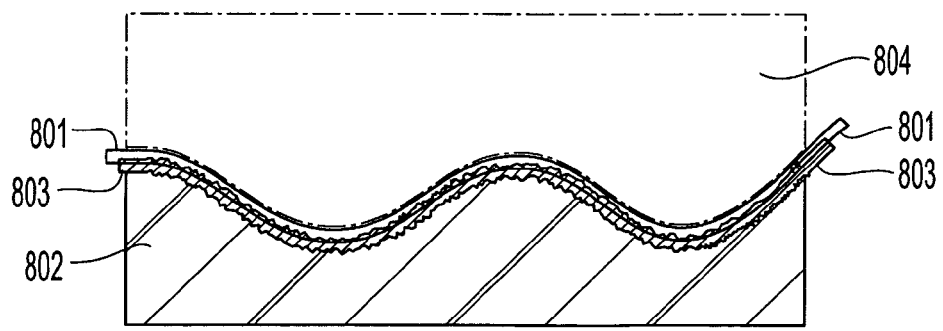

FIGS. 24A-24C are a sequence of cross-sectional views illustrating a process for simultaneously laminating and embossing a textured composite material according to another aspect of the present invention. As depicted in FIG. 24A, a thermoplastic adhesive layer 803 can be superposed between an outer layer 801 and backing layer 802. Alternatively, as depicted in FIG. 24B, a thermoset adhesive layer 803' can be placed between backing 802 and fabric 801. Subsequently, as depicted in FIG. 24C, the superposed layers can be simultaneously laminated and embossed using heated patterned tool 804 by applying low pressures, under about 200 psi, for about 10 to 60 seconds, with the heated tool temperatures raised at least about 20 degrees C. above the melting or setting point of the adhesive layer 803, but remaining below the melting or decomposition point of the fibers in the outer layer 801.

Figure 25A:
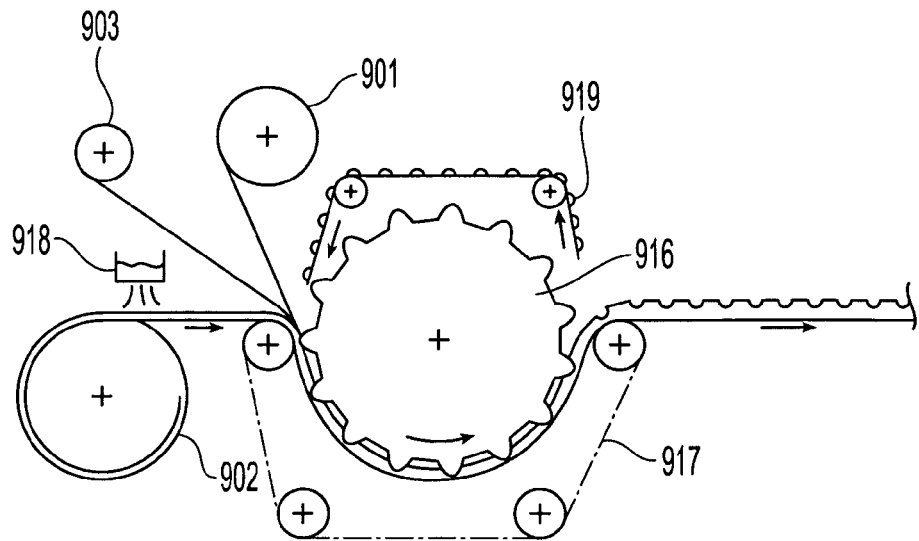
FIGS. 25A and 25B are cross-sectional views of two different fabrication systems suitable for simultaneously laminating and embossing the textured composite material shown in FIGS. 24A-24C.
Figure 25B:
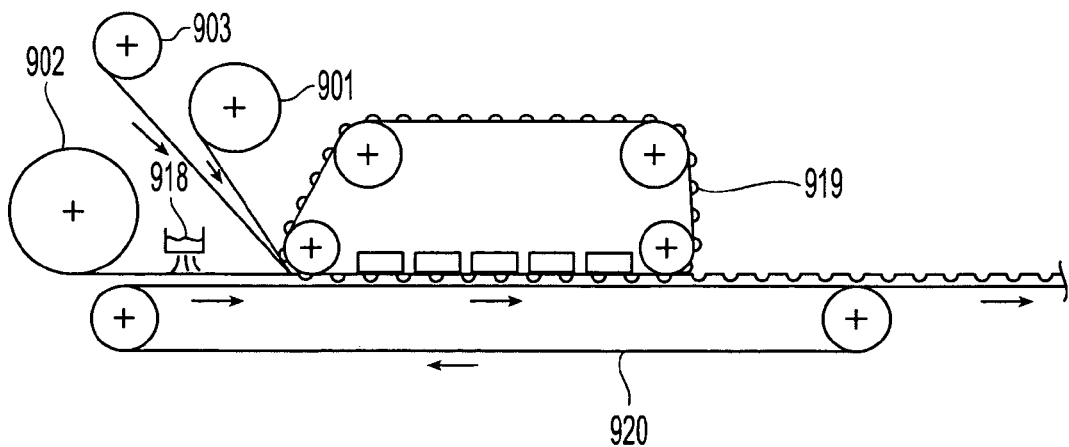

FIGS. 25A and 25B are cross-sectional views of two examples of fabrication systems suitable for simultaneously laminating and embossing outer layer 901, adhesive layer 902, and backing layer 903 to produce the textured composite material, according to the sequence shown in FIGS. 24A-24C. FIG. 25A shows the use of a heated drum 916 having a patterned surface, enveloped with belt 917 having a smooth surface, exerting low-pressure for a finite length of time. An optional dispenser 918 can be used to add thermoset adhesive material in lieu of thermoplastic adhesive material. The embossing pattern could also be obtained with a patterned flexible belt 919, inserted between a smooth drum and an enveloping belt (not shown). The inserted belt could be produced with a flexible and heat-resistant material such as silicon rubber that can be cast with intricate and deep patterns, and can withstand high temperatures under the relatively low pressures involved in this process. Alternately patterns can be provided by inserting metal belting. A flexible heated patterned belt of the same design can also be used in a dual-belt laminator, as shown in FIG. 25B.

Figure 26A:
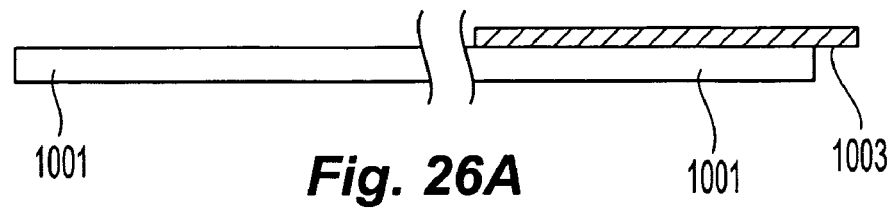
FIGS. 26A-26C are a sequence of cross-sectional views illustrating a process for embossing a structure comprising at least an outer layer and then adding a backing layer to form a textured composite material according to an embodiment of the present invention.
Figure 26B:
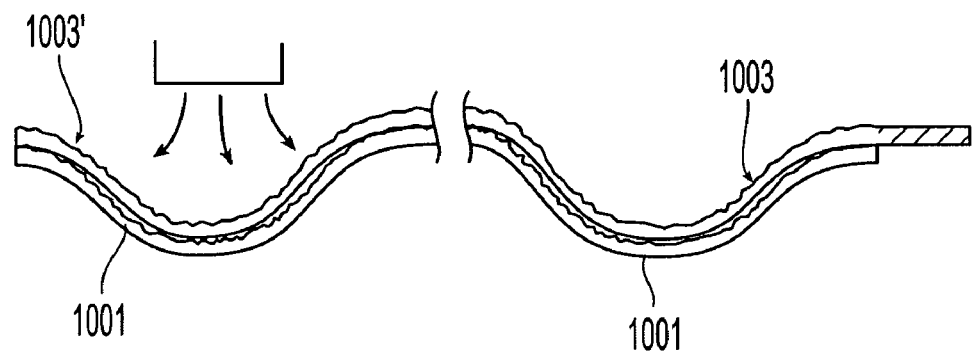
Figure 26C:
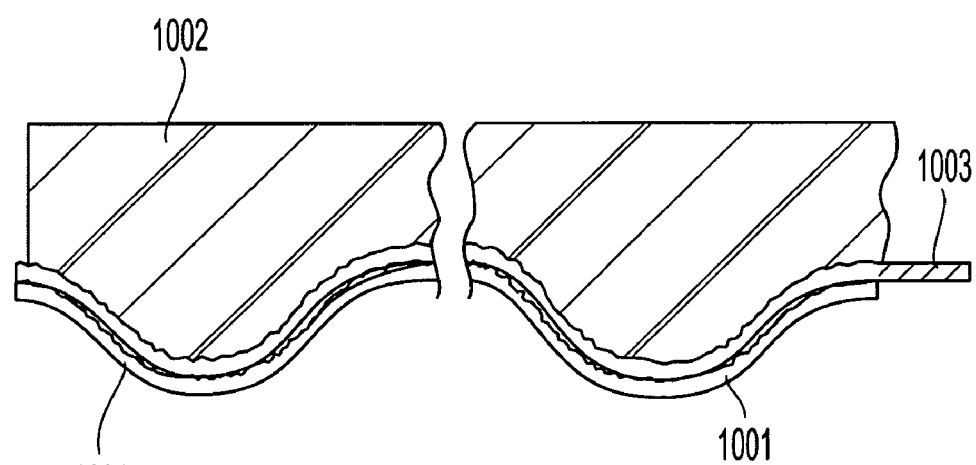

FIGS. 26A-26C are a sequence of cross-sectional views illustrating a process for embossing a structure comprising at least an outer layer 1001 and then adding a backing layer 1002 to form a textured composite material according to another aspect of the present invention. As shown in FIG. 26A, outer layer 1001 can have an optional overlaid adhesive layer 1003. As shown in FIG. 26B, outer layer 1001 can be pre-embossed, with or without adhesive layer 1003, placed over the backface. Most outer layer fabrics are capable of holding their embossed form for subsequent processing with or without added adhesives. However, adhesive 1003' can optionally also be post-applied, preferably by spraying after embossing, as shown in FIG. 26B. Subsequently, as shown in FIG. 26C, the textured composite can be filled with a backing layer 1002 having minimum depth H beyond the bottom of the pre-embossed face structure.

Figure 27A:
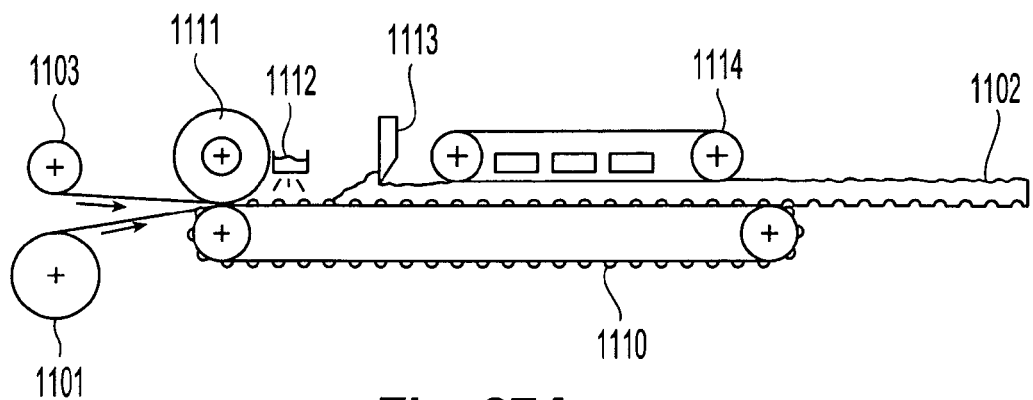
FIGS. 27A and 27B are cross-sectional views of two different fabrication systems suitable for embossing a structure and then adding a backing layer as shown in FIGS. 26A-26C.
Figure 27B:
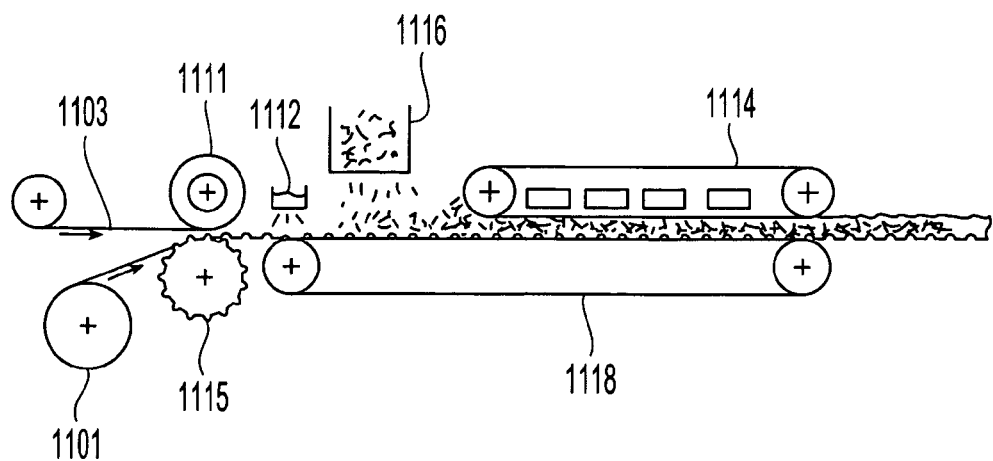

FIGS. 27A and 27B are cross-sectional views of two different fabrication systems suitable for embossing an outer layer 1101 and then adding a backing layer, according to the sequence shown in FIGS. 26A-26C. FIG. 27A shows a heated patterned belt 1110 that can be used to emboss the face fabric against a soft and resilient back-up roll 1111, optionally using the basic embossing/texturing process disclosed in the '470 and '186 applications, or any other embossing method. Adhesive layer 1103 could be introduced as a thermoplastic layer before embossing, as shown, or added as layer after embossing (not shown). Radiant heat 1112 may be applied in the case of thermoplastic binders before the backside is filled with a foamable compound using device 1113, or with bondable particulates using device 1113, and finished between heated top belt 1114 and unheated or cooled lower belt 1110. The embossed material is "nested" on belt 1110, and therefore moderate pressure can be applied during the heat-finishing step, without deforming the face texture.

FIG. 27B shows the alternative use of a heated patterned roll 1115 against a soft elastic roll 1111, after which the embossed outer fibrous layer 1101 is transferred to a flat belt and filled with particulates, or foam using device 1116, forming a backing. In this arrangement, the outer fibrous layer 1101 is made of a material that can hold the embossed pattern until the entire composite is formed and set between heated smooth belt 1114 and unheated or cooled smooth belt 1118. Most conformable thermoplastic fabrics are capable of satisfying this requirement. Adhesive layer 1103 may be added before foam or particulates are added, or simultaneously with the foam or particulates. In all cases the adhesive binder should engage both the outer fibrous layer 1101 and backing to secure them to each other. Layered applications of foam, particulates, expandable spherules, or overlaid sheets are permissible, provided that the properties of the formed backing are according to this invention at least down to a depth H, and that adhesive penetrates both the outer layer 1101 and backing throughout their interface. The pressure between the two belts should be kept to a minimum to avoid flattening the face texture. Heating and cooling along the upper and lower belts should also be regulated to ensure that the embossed face does not deform, and that the materials forming the backing are fully set. Commercial dual-belt laminators offer the choice of heating and cooling in any desired order or combination, all along the upper and lower belt faces.

Figure 28:
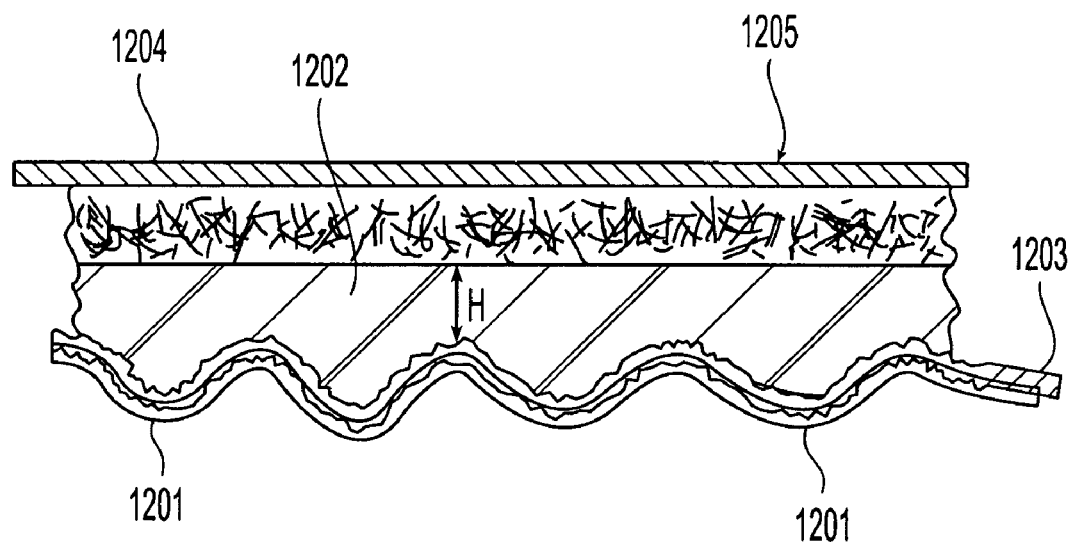
FIG. 28 is a cross-sectional view of a textured composite material with multiple backing layers according to another embodiment of the present invention.

A particularly effective arrangement is to provide binder and foamable matter as a thin layer against the back of the embossed fibrous outer layer 1101, and to add particulate fillers, such as ground and dispersed used carpet waste, followed by heating and consolidation. One such possible construction is shown in FIG. 28, which depicts a cross-sectional view of a textured composite material with multiple backing layers. More particularly, face layer 1201, or both face layer 1201 and adhesive layer 1202, are pre-embossed. Backing 1202 has the soft and elastic compressibility required by this invention at least to depth H, and it may consist of foam, particles, or a blend of foam and particles. Subsequently, layer 1204, which may be stiffer or sturdier than backing 1202, may be formed with recycled particulates, fibers and the like. Layer 1205 may also be attached to provide facial stability, water-blocking, rigidity, and other similar properties.

EXAMPLES

Set B

The present invention is now further illustrated by a second Set B of examples of certain representative embodiments thereof, wherein all parts, proportions and percentages are by weight unless otherwise indicated. All units of weight and measure not originally obtained in SI units have been converted to SI units.

In all of the examples below, the textured composite material comprised a fibrous outer layer, an adhesive layer, and a backing layer. The soft resilient backing was prepared from a blend of about 65% 15 denier, 7.6 cm (3 inch) polyester staple and 35% 3 denier, 7.6 cm (3 inch) polypropylene staple, which formed a felt weighing about 0.81 kg/m$^2$ (24 oz/yd$^2$), and that was approximately 6.0 mm (0.25 inches) thick after needlepunching at about 69.8 penetrations per square centimeter (450 penetrations per square inch). The felt was compressible by approximately 35% under a load of about 0.14 MPa (20 psi). Moreover, the felt was permanently thermo-embossable, with an embosser temperature above about 150 degrees C., whereupon the polypropylene fibers are melted. Subsequently, upon cooling, the polypropylene fibers were solidified and the texture was held at the embossed depth, resulting in a permanent face texture.

The fibrous outer layer comprised a commercial knit white textured polyester fabric that was heat-set to allow a stretch of approximately 40% in the machine direction and 160% in the cross direction when pulled with a force of only about 10 lbs/inch of width. The relaxed fabric had a thickness of about 0.7 mm and weighed about 265 gms/m² (7.8 oz/yd²).

The adhesive used in all examples consisted of two layers of black polyethylene film each having a basis weight of about 0.15 kg/m² (4.3 oz/yd²) and a thickness of approximately 0.15 mm (6.1 mil), thus providing a total basis weight of about 0.30 kg/m² (8.6 oz/yd²) and a thickness of approximately 0.30 mm (12.2 mil).

Lamination or embossing was performed with a press equipped with one platen heated to about 204 degrees Celsius (400 degrees F.). For flat pre-laminations, the flat heated platen was placed against the face layer and pressed against the sample. For embossing, the heated upper press-platen was pressed against a metal patterning plate 90 placed above the face layer having protrusions 92, as described above in Example 1 and illustrated in FIGS. 9 and 10. This configuration fixes the maximum potential distance X, between adjacent depressions, to approximately 5 mm; the maximum potential dimension Y of the depressed areas to approximately 2 mm; and the maximum potential depth D of depressed over elevated areas to approximately 1.5 mm. Pressure and time under pressure were varied to demonstrate the different characteristics of each Example.

The Examples below demonstrate the advantages of this invention in face and edge durability as well as dimensional and planar stability compared to structures using the same fibrous outer layer, the same adhesive layer, and the same backing layer. Durability is evaluated with the standard Vetterman test, described above.

Stability versus thermal and humidity changes can be determined with a dimensional stability test, as described above and as follows. A 20.3 cm×20.3 cm (8 inch×8 inch) square sample of material to be tested is placed on a flat surface in an oven at 80° C. The sample is kept in the oven for 1 minute. The sample is taken from the oven and allowed to cool to room temperature for 30 minutes. The cooled sample is immersed in water and permitted to dry in a horizontal orientation on a flat surface for 48 hours at room temperature. The sample is examined for doming, and cupping. Measurements of vertical offset between the center and the edge of the sample are made immediately prior to removing the sample from the oven, at the expiration of the 30-minute cooling period and at the end of the 48-hour drying period. Less than about 4 mm vertical deflection from a horizontal plane is considered to demonstrate absence of doming or cupping. The products of this invention exhibit negligible doming or cupping.

An indirect test, evaluating the propensity of the product to deflect out of plane with positive or negative changes in face temperature relative to the backing, was conducted as follows. A sample is placed on a surface heated to 100 degrees C., either on its face or on its back, and observed if it visibly deforms out of plane at any time as temperature rises from the exposed side up to the opposite side until it reaches equilibrium. The sample was allowed 5 minutes to reach equilibrium. The products of this invention show no visible warping out of plane as the temperatures change.

Example 7

Laminate then Emboss

In this example, a textured composite material was fabricated by the process sequence depicted in FIGS. 22-23, wherein the three layers are first pre-laminated flat and then embossed. First, the three layers, each measuring approximately 30.5×20.3 cm (12×8 in), were placed on the lower unheated flat platen, and then pre-laminated without embossing by pressing the upper heated flat platen to apply a pressure of approximately 0.965 MPa (140 psi) for a total of 20 seconds. Subsequently, the patterning plate was placed on the pre-laminated assembly, and the upper heated platen was lowered to apply a pressure of approximately 0.965 MPa (140 psi) for another 10 seconds. The pressure was then released, the platens were separated, and the composite removed from the press and allowed to cool. The face of the laminate conformed to the contour of the heated plate. No adhesive propagated to the outer surface at the depressed or elevated areas. The fibrous outer layer and backing layer could not be separated at the depressed or elevated areas. The thickness of the fibrous outer layer was approximately 0.6 mm at the elevated areas, and approximately 0.5 mm at the depressed areas. Dimension D was consistently near 1.5 mm, corresponding to a ratio of $D/T_u$ of approximately 2.5, as noted in FIG. 17.

As shown in Table VII, the sample of Example 7 had an "excellent" wear rating of 4.0 after 5,000 Vetterman cycles and a "good" rating of 3.0 after 30,000 Vetterman cycles. A rating of 2.0 is acceptable and a rating of 4.0 is excellent. The cut edges remained virtually unchanged. The sample was flat upon cooling, and did not "dome" or "cup" when subjected to the dry/wet test and exhibited no visible deflection when subjected to the thermal deflection test. Thus, the sample was an exceptionally durable and stable floorcovering, which could be suitable as a floor tile. The sample had an overall weight of only approximately 1360 gms/m² (40 oz/yd²).

Example 7A

Flat Laminate, No Texture

The flat laminate of Example 7 was reproduced without the embossing step. The laminate was slightly curled after cooling. It was durable but dimensionally unstable, as shown in Table VII. Thus, this product still requires an additional stabilizing layer under the outer layer or under the backing. It solves the problem of edge-raveling problem, but retains the propensity to warp with thermal and moisture variations.

Example 8

Simultaneous Lamination and Embossing

The three layers were placed on the cold lower platen of the press and simultaneously laminated and embossed as shown in FIGS. 24-25, with the patterning plate placed on top and the upper platen heated to about 204 degrees Celsius (400 degrees F.). A pressure of 0.965 MPa (140 psi) was applied for 30 seconds. Table VII shows that the results were similar to those of Example 7.

Example 8A

Equivalent to Structure in U.S. patent application Ser. No. 10/611,470

Repeating Example 8, with approximately fifteen-fold pressure (about 2,000 psi) and approximately one tenth of the time under pressure (about 3 seconds), resulted in good dimensional stability and good but inferior durability, as shown in Table VII. The sample was flat after cooling. As expected, the layers were separable at cut edges at the elevated areas, and slight rising at the cut edges occurred after wear testing.

Example 8B

Low-Profile Texture

Repeating Example 8A, with the pressure decreased to 4.14 MPa (600 psi), produced a textured composite that was still well-bonded at the depressed areas. However, it had a shallow profile, and it exhibited unsatisfactory adhesion at the elevated areas, low durability and unsatisfactory dimensional stability, as shown in Table VII.

TABLE VII

| Ex. | Total Wt/ Thickness (oz/mm) | Distance D (mm) | Elevated area $T_u$ (mm) | Depth H (mm) | Ratio $D/T_u$ | Stability (Wet/Dry %) | Warp (mm) Top/Bottom | Vetterman Rating (5M/30M) | Edge Rise |
|---|---|---|---|---|---|---|---|---|---|
| 7   | 40/5.8 | 1.5 | 0.6 | 3.5 | 2.5 | 0 | 0/0   | 4.0/3.0 | No  |
| 7A  | 40/5.7 | 0   | 0.7 | 4.7 | 0   | 6 | 8/2   | 3.0/2.0 | No  |
| 8   | 40/5.6 | 1.3 | 0.6 | 3.6 | 2.1 | 0 | 0/0   | 3.5/3.0 | No  |
| 8A  | 41/6.0 | 1.4 | 0.7 | 4.0 | 2.0 | 0 | 0/0   | 3.5/2.0 | Yes |
| 8B  | 40/6.3 | 0.6 | 0.7 | 5.0 | 0.9 | 4 | 10/15 | 1.5/1.0 | Yes |

Although specific forms of the invention have been selected for illustration in the drawings and the preceding description is drawn in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims.

What is claimed is:

1. A textured composite having a surface area and comprising a continuous or integral fibrous outer layer that is bonded continually to an activated adhesive layer, wherein the continuous or integral fibrous outer layer comprises a textile fabric, wherein the surface area topographically comprises depressed areas and elevated areas,
    wherein the fibrous outer layer and the intermediate adhesive layer are non-planar and follow substantially the same undulating contour,
    wherein a lateral distance, X, between adjacent depressed areas and a lateral distance, Y, between adjacent elevated areas in at least one direction are each from about 1.5 mm to about 10 mm,
    wherein the depressed areas descend to a depth, D, measured from the top of the outer layer at the elevated areas to the top of the outer layer at adjacent depressed areas, that equals or exceeds a thickness, $T_u$, measured from the top of the outer layer at the elevated areas to the bottom of the adhesive layer at the elevated areas,
    wherein the textured composite material is useable as a floor cover.

2. The textured composite of claim 1 further comprising a compressible and resilient backing layer, wherein depth D equals or exceeds a thickness, $T_u$, measured from the top of the outer layer at the elevated areas to an interface of the outer layer and backing layer at the elevated areas.

3. The textured composite of claim 1, wherein a combined density of the fibrous outer layer and the adhesive layer in the depressed areas is less than about 0.7 g/cm$^3$.

4. The textured composite of claim 1, wherein no adhesive reaches the peak regions of the elevated areas.

5. The textured composite of claim 2, wherein the backing layer has a minimum resilient depth, H, of at least about 2 mm below the interface of the outer layer and backing layer, and a compressibility higher than at least about 10% under a pressure of about 20 psi.

6. The textured composite of claim 1, wherein the composite deflects out of plane by less than about 4%.

7. The textured composite of claim 1, wherein the composite deflects out of plane by less than about 2%.

8. The textured composite of claim 1, wherein the composite can exhibit a rating of at least about 2.0 after about 5,000 cycles in a Vetterman drum.

9. The textured composite of claim 1, wherein the composite can exhibit a rating of at least about 2.0 after about 20,000 cycles in a Vetterman drum.

10. The textured composite of claim 1, wherein the composite has a weight exceeding about 25 oz/yd$^2$.

11. The textured composite of claim 1, wherein the composite has a bending length ratio above about 5/1.

12. The textured composite of claim 1, wherein the composite has an overall thickness exceeding about 2.5 mm.

13. The textured composite of claim 1, wherein the continuous or integral fibrous outer layer is formed from a textile fabric selected from the group of fabrics consisting of wovens, warp-knits, circular weft-knits, non-wovens and mixtures thereof.

14. The textured composite of claim 1 further comprising one or more functional layers.

15. The textured composite of claim 14, wherein at least one or more functional layers is a layer selected from the group consisting of an antimicrobial layer, a fire-retardant layer, a water-blocking layer and combinations thereof.

16. The textured composite of claim 2, wherein the backing layer is a felt with a basis weight in the range of about 15 to about 80 oz/yd$^2$ and needlepunched with a density of about 300 to about 1000 penetrations per inch.

17. The textured composite of claim 1, wherein the adhesive layer comprises a polyethylene film or fabric.

18. The textured composite of claim 1, wherein a ratio $D/T_u$ is greater than or equal to about 1.25.

19. The textured composite of claim 1, wherein a ratio $D/T_u$ is greater than or equal to about 1.5.

20. The textured composite of claim 1, wherein a ratio $D/T_u$ is greater than or equal to about 1.75.

21. The textured composite of claim 1, wherein a ratio $D/T_u$ is greater than or equal to about 2.0.

22. A textured composite having a surface area and comprising a continuous or integral fibrous outer layer that is bonded continually to an activated adhesive layer,
    wherein the continuous or integral fibrous outer layer comprises a textile fabric, wherein the surface area topographically comprises depressed areas and elevated areas,
    wherein the fibrous outer layer and the intermediate adhesive layer are non-planar and follow substantially the same undulating contour, wherein at least some of the fibers on the outer surface of the fibrous outer layer in the elevated areas are unbonded to the adhesive layer, wherein a lateral distance between adjacent depressed areas in at least one direction is from about 1.5 mm to about 20 mm, wherein the elevation of the elevated area, D, measured from the top of the outer layer at the elevated areas to the top of the outer layer at adjacent depressed areas, is greater than the thickness of fibrous outer layer, $T_f$, measured from the top of the outer layer to the bottom of the outer layer at the elevated areas, and wherein the textured composite material is useable as a floor cover.

23. The textured composite of claim 22, wherein a combined density of the fibrous outer layer and the adhesive layer in the depressed areas is less than about 0.7 g/cm$^3$.

* * * * *